(12) United States Patent
Zhou et al.

(10) Patent No.: US 12,096,877 B2
(45) Date of Patent: Sep. 24, 2024

(54) CYCLIC PREHEATING COFFEE POT AND WORKING METHOD THEREOF

(71) Applicant: GUANGZHOU CONWIDE TECHNOLOGY CO., LTD., Guangdong (CN)

(72) Inventors: Linbin Zhou, Guangdong (CN); Xuebin Wang, Guangdong (CN)

(73) Assignee: GUANGZHOU CONWIDE TECHNOLOGY CO., LTD., Guangdong (CN)

(*) Notice: Subject to any disclaimer, the term of this patent is extended or adjusted under 35 U.S.C. 154(b) by 705 days.

(21) Appl. No.: 17/427,108

(22) PCT Filed: Jan. 30, 2019

(86) PCT No.: PCT/CN2019/074011
§ 371 (c)(1),
(2) Date: Jul. 30, 2021

(87) PCT Pub. No.: WO2020/154987
PCT Pub. Date: Aug. 6, 2020

(65) Prior Publication Data
US 2022/0095827 A1    Mar. 31, 2022

(51) Int. Cl.
*A47J 31/10*    (2006.01)
*A23F 5/26*    (2006.01)
(Continued)

(52) U.S. Cl.
CPC ............... *A47J 31/106* (2013.01); *A23F 5/26* (2013.01); *A47J 31/0605* (2013.01);
(Continued)

(58) Field of Classification Search
CPC .... A47J 31/461; A47J 31/468; A47J 31/0605; A47J 31/545; A47J 31/56; A47J 31/10; A47J 31/106
See application file for complete search history.

(56) References Cited

U.S. PATENT DOCUMENTS 4,969,392 A * 11/1990 Steele ...................... A47J 31/56
99/305
5,193,437 A * 3/1993 Roberts ............... A47J 31/4439
99/295
(Continued)

FOREIGN PATENT DOCUMENTS

CN        1470207       1/2004
CN        2746853       12/2005
(Continued)

OTHER PUBLICATIONS

"International Search Report (Form PCT/ISA/210) of PCT/CN2019/074011," mailed on Oct. 24, 2019, with English translation thereof, pp. 1-4.

*Primary Examiner* — Sean M Michalski
(74) *Attorney, Agent, or Firm* — JCIP GLOBAL INC.

(57) ABSTRACT

A cyclic preheating coffee pot includes a main body, a brewing cavity, a water supply apparatus, a heating apparatus, a water inlet pipe and a water outlet pipe mounted on the main body, and a control apparatus, a driving apparatus and a flow dividing structure mounted on the main body. The water supply apparatus is communicated with the heating apparatus, the water supply apparatus is configured to supply water to the heating apparatus, and the water outlet pipe is communicated with the heating apparatus and the flow dividing structure. The flow dividing structure includes a first branch. The water outlet pipe is communicated with the water supply apparatus via the first branch, such that the water supply apparatus, the water inlet pipe, the heating (Continued)

apparatus, the water outlet pipe and the first branch are communicated and form a cyclic pipeline provided with a one-way valve apparatus or a water pump.

21 Claims, 15 Drawing Sheets

(51) Int. Cl.
  *A47J 31/06* (2006.01)
  *A47J 31/46* (2006.01)
  *A47J 31/54* (2006.01)
  *A47J 31/56* (2006.01)

(52) U.S. Cl.
  CPC ........... *A47J 31/461* (2018.08); *A47J 31/465* (2013.01); *A47J 31/468* (2018.08); *A47J 31/545* (2013.01); *A47J 31/56* (2013.01)

(56) References Cited

U.S. PATENT DOCUMENTS

| | | | | |
|---|---|---|---|---|
| 6,170,387 | B1* | 1/2001 | Cheung | A47J 31/0576 |
| | | | | 99/283 |
| 6,557,584 | B1* | 5/2003 | Lucas | A47J 31/56 |
| | | | | 99/305 |
| 10,463,192 | B2* | 11/2019 | Anthony | A47J 31/462 |
| 10,631,682 | B1* | 4/2020 | Millikin | A47J 31/10 |
| 11,559,162 | B1* | 1/2023 | Wang | A47J 31/32 |
| 2017/0280924 | A1* | 10/2017 | Sakane | A47J 31/60 |
| 2018/0103792 | A1* | 4/2018 | De'Longhi | A47J 31/4485 |
| 2019/0059640 | A1* | 2/2019 | Wong | A47J 27/004 |
| 2019/0223653 | A1* | 7/2019 | De'Longhi | A47J 31/461 |
| 2019/0343327 | A1* | 11/2019 | Noordhuis | A47J 31/468 |
| 2020/0054164 | A1* | 2/2020 | Moon | A47J 31/461 |
| 2020/0129001 | A1* | 4/2020 | Romandy | A47J 31/10 |

FOREIGN PATENT DOCUMENTS

| | | |
|---|---|---|
| CN | 102018448 | 4/2011 |
| CN | 207755078 | 8/2018 |
| WO | 2019011234 | 1/2019 |

* cited by examiner

CYCLIC PREHEATING COFFEE POT AND WORKING METHOD THEREOF

CROSS-REFERENCE TO RELATED APPLICATION

This application is a 371 of international application of PCT application serial no. PCT/CN2019/074011, filed on Jan. 30, 2019. The entirety of the above mentioned patent application is hereby incorporated by reference herein and made a part of this specification.

BACKGROUND

Technical Field

The present invention relates to the field of beverage preparation equipment, in particular to a cyclic preheating coffee pot and a working method thereof.

Description of Related Art

A conventional coffee pot with a heating function can heat water for making coffee after a user adds water (usually tap water). By using the coffee pot with the heating function, it is unnecessary for the user to use other heating apparatuses to heat before brewing coffee, thereby bringing certain convenience to the user brewing coffee. The coffee pot with the heating function is usually provided with a heating apparatus, a water supply unit supplies water to the heating apparatus to heat water, and the heating apparatus conveys the heated water to a brewing unit of the coffee pot via a water outlet pipe. However, the coffee pot with the heating function has defects. As a result of a hydraulic pressure, water that entered the heating apparatus will flow to the water outlet pipe partially. In the heating process of the heating apparatus, although the water in the heating apparatus can be heated, cold water entering the water outlet pipe has not been heated yet. Thus, when the water in the heating apparatus is heated to a set temperature and hot water is conveyed to the brewing unit via the water outlet pipe, the cold water that is at the water outlet pipe originally enters the brewing unit first, thereby, affecting the effect of brewing coffee. In addition, hot water in the heating apparatus will be mixed with part of cold water in the water outlet pipe when entering the water outlet pipe, and at the moment, thus, the water temperature in the water outlet pipe is still lower than the water temperature of the hot water in the heating apparatus, and the part of water which is relatively low in temperature enters the brewing unit, which will affect the effect of brewing coffee too.

As mentioned above, the conventional coffee pot with the heating function cannot guarantee that water supplied to the brewing unit is constant in temperature or cannot guarantee that water supplied to the brewing unit is within a constant temperature range (for example, 80 to 100° C.), thereby destroying the effect of brewing coffee.

In addition, the conventional coffee pot with the heating function cannot have the heating function and a cold brew function simultaneously, such that it is inconvenient to use the coffee pot. It may cost 12-48 hours to make cold brew coffee with better taste by using a tool for conventional cold brew coffee, and the time cost is very high. Therefore, how to shorten the extraction time and dissolve substances in coffee powder in water quickly and sufficiently so as to make the cold brew coffee efficiently and quickly is a problem needed to be resolved immediately.

SUMMARY

In order to overcome defects in the prior art, it is thereof an object of the present invention to provide a cyclic preheating coffee pot with a preheating function.

In order to overcome defects in the prior art, the present invention provides a cyclic preheating coffee pot and includes a main body, a brewing cavity, a water supply apparatus, a heating apparatus, a water inlet pipe and a water outlet pipe mounted on the main body respectively, and further includes a control apparatus, a driving apparatus and a flow dividing structure mounted on the main body. The water supply apparatus is communicated with the heating apparatus via the water inlet pipe, the water supply apparatus is configured to supply water to the heating apparatus via the water inlet pipe, one end of the water outlet pipe is communicated with the heating apparatus, and the other end of the water outlet pipe is communicated with the flow dividing structure. The flow dividing structure includes a first branch and a second branch, the water outlet pipe is communicated with the water supply apparatus via the first branch, such that the water supply apparatus, the water inlet pipe, the heating apparatus, the water outlet pipe and the first branch are communicated in sequence and can form a cyclic pipeline. The cyclic pipeline is provided with a one-way valve apparatus to define a direction of a water flow, or the cyclic pipeline is provided with a water pump to define the direction of the water flow. The heating apparatus is used for preheating or heating water flowing into the heating apparatus, the second branch is provided with a water outlet switch, and the water outlet switch is used for opening or closing the second branch, such that when the water outlet switch is turned on, the water outlet pipe is communicated with the brewing cavity via the second branch, and when the water outlet switch is turned off, the water outlet pipe is not communicated with the brewing cavity, and the control apparatus is electrically connected with the driving apparatus. The control apparatus is configured to control the driving apparatus, such that the driving apparatus drives the water outlet switch to be turned on, and therefore, water flows through the second branch from the water outlet pipe and enters the brewing cavity.

When the cyclic preheating coffee pot of the solution is used, the water supply apparatus supplies water to the heating apparatus via the water inlet pipe to preheat the water, water in the heating apparatus is heated to expand in volume, the water is lessened in density and lightened and the water level will be raised. Furthermore, limited by the one-way valve apparatus, the water cannot flow back to the water supply apparatus from the heating apparatus via the water inlet pipe, and thus, the water flows into the water outlet pipe and the first branch and flows back to the water supply apparatus in sequence after being preheated. Then, the water flows into the heating apparatus from the water supply apparatus via the water inlet pipe to be preheated and then flows back to the water supply apparatus. Thus, the water can flows cyclically in the cyclic pipeline and is preheated by the heating apparatus. As the water flows cyclically, a condition that a part of cold water still left in the water outlet cannot be heated when the coffee brewer heats like a conventional coffee brewer is avoided. When the water in the cyclic pipeline is preheated completely, the water can flow into the heating apparatus again. The driving apparatus is controlled by the control apparatus to drive the water outlet switch to be turned on, the heated water flowing into the apparatus flows out of the water outlet pipe from the heating apparatus and enters into the brewing cavity for brewing coffee via the second branch. Thus, it can be ensured that there is no cold water flowing into the brewing cavity from the water outlet pipe, and therefore, the brewing effect can be improved. In addition, it is unnecessary to arrange an extra preheating apparatus and it is only necessary to realize the preheating and heating functions by means of the heating apparatus. The coffee pot is simple in structure and convenient to use. The one-way valve apparatus can be further replaced by the water pump. When the cyclic preheating coffee pot is used, the water supply apparatus supplies water to the heating apparatus via the water inlet pipe to preheat the water, water in the heating apparatus is heated to expand in volume, the water is lessened in density and lightened and the water level will be raised. Furthermore, a water flow direction can be limited by the water pump, such that the water cannot flow back to the water supply apparatus from the heating apparatus via the water inlet pipe, and thus, the water flows into the water outlet pipe and the first branch and flows back to the water supply apparatus in sequence after being preheated.

In one embodiment, the water supply apparatus includes a water tank mounted on the main body, the water tank is communicated with the heating apparatus via the water inlet pipe, the water tank is configured such that a bottom portion of the water tank is higher than a bottom portion of the heating apparatus, and the water outlet pipe is communicated with the water tank via the first branch, such that the water tank, the water inlet pipe, the heating apparatus, the water outlet pipe and the first branch can form the cyclic pipeline jointly. Specifically, the water tank can be arranged above the heating apparatus. As the bottom portion of the water tank is higher than the bottom portion of the heating apparatus, water in the water tank can flow into the heating apparatus easily from the water tank via the water inlet pipe to be heated by no means of the water pump.

In an embodiment, the water supply apparatus includes the water tank mounted on the main body, the cyclic preheating coffee pot includes the water pump and the one-way valve apparatus that are mounted on the main body, i.e., the cyclic preheating coffee pot is provided with the water pump and the one-way valve apparatus simultaneously, and the water pump is configured to pump water in the water tank to the heating apparatus, such that water flows back to the water tank or the brewing cavity via the heating apparatus, the water outlet pipe and the flow dividing structure.

Specifically, the water pump can be arranged between the water tank and the water inlet pipe, is communicated with the water tank and the water inlet pipe respectively and is used for pumping water in the water tank to the heating apparatus, such that water is further pumped to the water outlet pipe and flows back to the water tank or enters the brewing cavity via the water outlet pipe. The water pump can be further arranged on the water tank and the water outlet pipe or can be further arranged on the water tank. Specifically, the water pump can be further arranged between the water inlet pipe and the heating apparatus and is used for pumping water in the water tank to the heating apparatus, such that water is further pumped to the water outlet pipe and flows back to the water tank or enters the brewing cavity via the water outlet pipe. The water pump can be further arranged in the water tank or in other positions of the main body of the cyclic preheating coffee pot. With respect to arrangement of the water pump, it is feasible as long as it meet a condition that the water pump can pump water in the water tank to the heating apparatus and water flows back to the water tank or enters the brewing cavity via the water outlet pipe. If the water pump is arranged, as water can be pumped via the water pump, the bottom portion of the water tank does not have to be higher than the bottom portion of the heating apparatus. When the bottom portion of the water tank is higher than the bottom portion of the heating apparatus, water can be conveyed more efficiently and quickly by using the water pump.

In an embodiment, the first branch is provided with a reflux switch and the reflux switch is used for opening or closing the first branch. When it is necessary to preheat water in the water tank cyclically, the reflux switch is turned on, such that water in the water tank can flow back to the water tank via the water outlet pipe and the first branch after being preheated by the heating apparatus. Thus, the water can flows cyclically in the cyclic pipeline and is preheated. When it is unnecessary to preheat water in the water tank cyclically, the reflux switch can be turned off, such that the water in the water tank can be prevented from flowing back to the water tank. Specifically, the flow dividing structure is provided with a water inlet, a first water outlet and a second water outlet. The water inlet is communicated with the first water outlet to form the first branch and the water inlet is communicated with the second water outlet to form the second branch. The water outlet switch can be arranged in a position corresponding to the first water outlet to open or close the first water outlet, and the reflux switch can be arranged in a position corresponding to the second water outlet to open or close the second water outlet. The first end of the water outlet pipe is communicated with the heating apparatus, the second end of the water outlet pipe is communicated with the water inlet, the first water outlet is communicated with the water supply apparatus, and the second water outlet is communicated with the brewing cavity.

In an embodiment, the control apparatus includes a first temperature controller. The cyclic preheating coffee pot comprises a power supply board mounted on the main body, and the first temperature controller and the driving apparatus are electrically connected with the power supply board respectively. Specifically, the first temperature controller can control the driving apparatus to work according to the temperature of water in the cyclic pipeline. When the temperature of water in the water tank reaches a predetermined temperature, the first temperature controller sends a signal to the power supply board, such that the power supply board supplies power to the driving apparatus, and thus, the driving apparatus drives the water outlet switch to be turned on. Thus, the preheated water in the water tank can enter the heating apparatus again to be heated and can flow through the water outlet pipe and the second branch in sequence so as to enter the brewing cavity for brewing coffee. The above-mentioned predetermined temperature can be ranged from 40 to 70° C., and preferably, the predetermined temperature can be ranged from 50 to 60° C. Here, it is necessary to note that in the preheating process, as the water flows cyclically, the temperatures of water in different positions of the cyclic pipeline may be different at a same time point. For example, at the same time point in the preheating process, as the heating apparatus is in a heating state, water entering the heating apparatus will be warmed, such that the temperature of water located in the heating apparatus is higher than the temperature of water located in the water inlet pipe. Similarly, as water warmed in the heating apparatus flows into the water outlet pipe, the temperature of water in the water outlet pipe is higher than the temperature of water in the water tank, and therefore, when the water in the water tank reaches the predetermined temperature, for example, the water in the water tank is 60° C., water in the water outlet pipe has reached a higher temperature, for example 90° C. Or, the heating apparatus can work continuously from the preheating process to the heating process, and there can be no time interval between the preheating process and the heating process. For example, water in the water tank is preheated cyclically and heated to over 90° C. via the heating apparatus and the water pump, the water outlet switch is turned on, the water enters into the brewing cavity for brewing coffee with coffee powder, and the water pump and/or the heating apparatus can work continuously or stop working.

In an embodiment, the brewing cavity is detachably connected with the water tank, such that the brewing cavity can be detached and cleaned and the coffee powder can be put in the brewing cavity. In order to filter the brewed coffee, a bottom portion of the brewing cavity is provided with a discharge outlet for discharging coffee, the brewing cavity is provided with a first filtering element, and the first filtering element is configured to enable coffee to be filtered by the first filtering element before flowing out of the brewing cavity via the discharge outlet.

In an embodiment, the driving apparatus includes a driving element, a motor or an electromagnetic valve, the motor or the electromagnetic valve is arranged on the main body, and the motor or the electromagnetic valve is connected with the driving element for driving the driving element to move.

In an embodiment, the discharge outlet is provided with the discharge switch, and the discharge switch is used for opening or closing the discharge outlet. The discharge switch is arranged, such that it is favorable for the user to select different brewing modes. If it is only needed to make contact of the coffee powder and water within a very short time, it is unnecessary to close the discharge outlet, and the discharge switch may not be a must. However, in the brewing process, if it is necessary to make contact of the coffee powder and the water for a longer time to dissolve the coffee powder, it is necessary to close the discharge outlet with the discharge switch.

In an embodiment, the driving element is provided with a first driving portion and a second driving portion, the first driving portion is located in a position corresponding to the water outlet switch and is used for driving the water outlet switch to be turned on, and the second driving portion is located in a position corresponding to the discharge switch and is used for driving the discharge switch to be turned on.

In an embodiment, the bottom portion of the water tank is provided with the flow dividing structure, the first branch of the flow dividing structure comprises a first channel configured to penetrate through a bottom portion of the water tank, and the second branch of the flow dividing structure is a transversely extending second channel arranged at the bottom portion of the water tank.

In an embodiment, the flow dividing structure further includes a hollow water outlet element located in the water tank, the hollow water outlet element is provided with a hollow water outlet element outlet and a hollow water outlet element inlet, the hollow water outlet element inlet is connected with the first channel in a sleeving manner, the hollow water outlet element outlet is provided with the reflux switch, the reflux switch is a movable valve, and the movable valve is used for opening or closing the hollow water outlet element outlet.

In an embodiment, in order to further filter coffee, the first filtering element is arranged in a position in front of the discharge outlet in the brewing cavity, the brewing cavity is further provided with a second filtering element, and the second filtering element is located at the discharge outlet.

In an embodiment, for the convenience of the user, the coffee pot further includes a container for holding a coffee liquid, the container is located below the discharge outlet, the container is provided with a container opening, and the container opening is provided with a third filtering element.

In an embodiment, the cyclic preheating coffee pot can be further used for cold brew coffee as well. The cyclic preheating coffee pot further includes an air supply apparatus, the air supply apparatus is arranged on the main body, the air supply apparatus is connected with the brewing cavity via the air guide part and is used for supplying air to the brewing cavity, such that the air supply apparatus can supply air to a liquid formed by mixing water with coffee powder when the brewing cavity contains water and coffee powder. After the coffee powder is put in the brewing cavity and the water supply apparatus supplies water to the brewing cavity, the air supply apparatus supplies gas to the liquid formed by mixing the water and the coffee powder, such that the gas will flow in the liquid. As the gas drives the liquid to flow and roll, the coffee powder and the water are fully stirred and substances in the coffee powder are accelerated to be dissolved in water, thereby achieving a quick and full extraction effect.

In an embodiment, the air guide part includes a first air guide pipe and a second air guide pipe, a top portion of the brewing cavity is provided with a brewing cavity opening, the first end of the first air guide pipe is communicated with the air supply apparatus, the second end of the first air guide pipe is separably connected with the first end of the second air guide pipe, and the second end of the second air guide pipe is inserted into the brewing cavity via the brewing cavity opening. As the second air guide pipe is inserted into the brewing cavity to be in contact with the liquid in the brewing cavity, the user may need to clean the second air guide pipe sometimes. By separating the second air guide pipe from the first air guide pipe, the second air guide pipe can be taken out to be cleaned, such that it is more convenient to use.

In an embodiment, the brewing cavity opening is provided with a brewing cavity cap capable of covering the brewing cavity opening, and the brewing cavity cap is provided with several pores. When the air supply apparatus supplies air to the brewing cavity, the brewing cavity cap can prevent the coffee powder from escaping from the brewing cavity opening to pollute the coffee pot. The pores in the brewing cavity cap facilitate discharge of gas in the brewing cavity.

In an embodiment, the brewing cavity cap is provided with the second air guide pipe, the second air guide pipe includes a cavity and a pipe portion communicated with the cavity, the brewing cavity cap is internally provided with the cavity, the cavity is communicated with the second end of the first air guide pipe, and the brewing cavity cap is provided with the pipe portion extending downward from the brewing cavity cap, such that the pipe portion extends into the brewing cavity when the brewing cavity cap covers the brewing cavity opening.

In an embodiment, the second air guide pipe penetrates through the brewing cavity opening, and the second end of the second air guide pipe is arranged in a position in the brewing cavity lower than a middle portion of the brewing cavity. The second end of the second air guide pipe is lower than the position of the middle portion of the brewing cavity, which facilitates contact between the second end of the second air guide pipe and the liquid in the brewing cavity.

It is thereof another object of the present invention to provide a working method of the coffee brewer.

The working method of a coffee brewer includes the following steps: a, adding coffee powder into a brewing cavity; b, adding water into a water supply apparatus; c, starting a heating apparatus, wherein the water flowing cyclically in a cyclic pipeline and is preheated by the heating apparatus; and d, controlling, by a control apparatus, a driving apparatus to start when the water in the water supply apparatus is preheated to the set temperature, and driving, by the driving apparatus, the water outlet switch to be turned on, wherein the water flows through the second branch from the water outlet pipe and enters the brewing cavity.

Further, the step d further includes turning on, by the driving apparatus, the discharge switch while driving, by the driving apparatus, the water outlet switch to be turned on.

The present invention has the beneficial effects that it can be ensured that there is no cold water flowing into the brewing cavity from the water outlet pipe by preheating water cyclically, and therefore, the brewing effect can be improved. In addition, it is unnecessary to arrange an extra preheating apparatus and the heating apparatus of the present invention realizes the preheating and heating functions. The coffee pot is simple in structure and convenient to use. In addition, the present invention further has a cold extraction function and can make the cold brew coffee efficiently and quickly.

DESCRIPTION OF THE EMBODIMENTS

Figure 1:
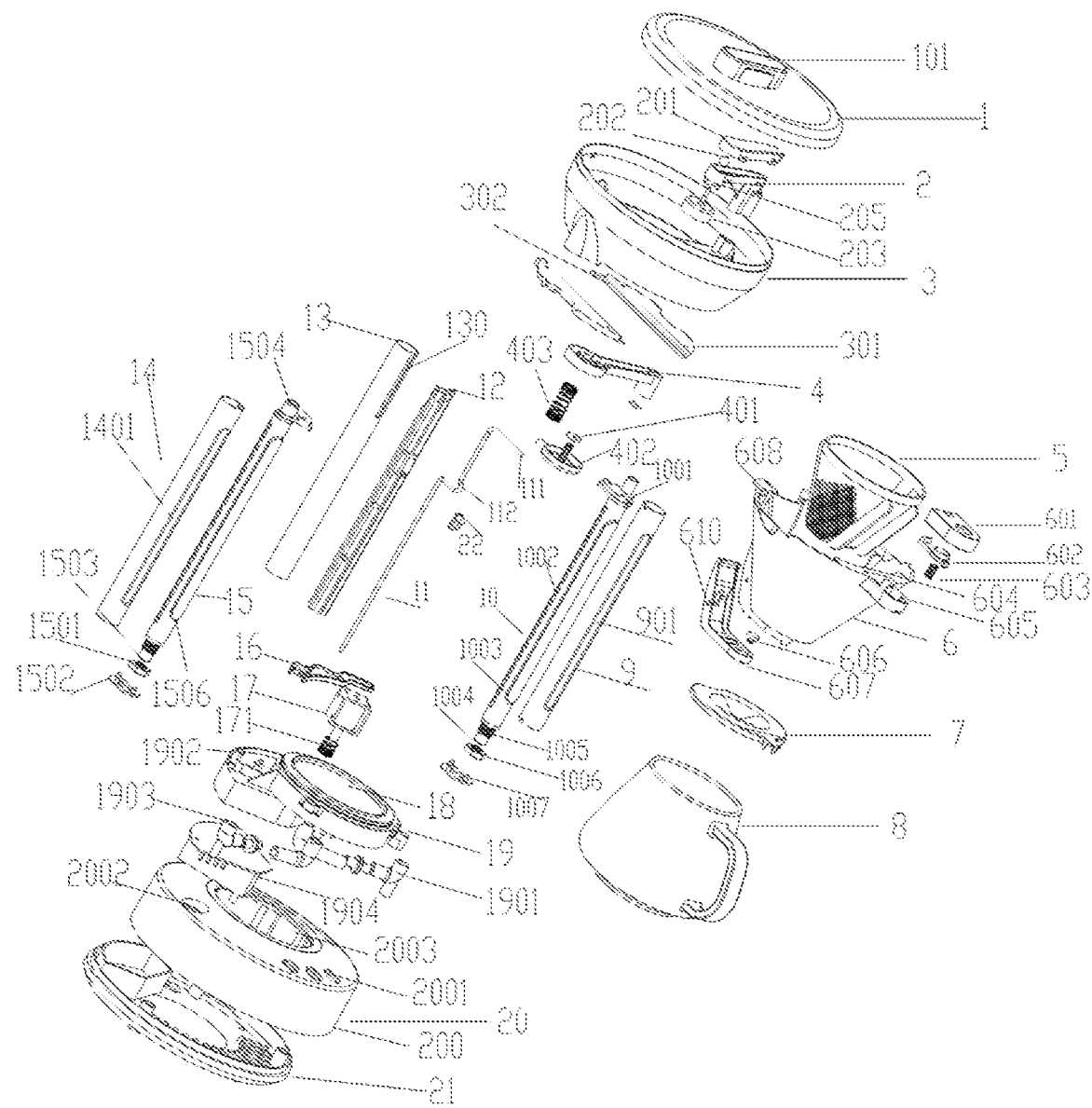
FIG. 1 is an exploded structural schematic diagram of a cyclic preheating coffee pot of the embodiment 1 of the present invention.
Figure 2:
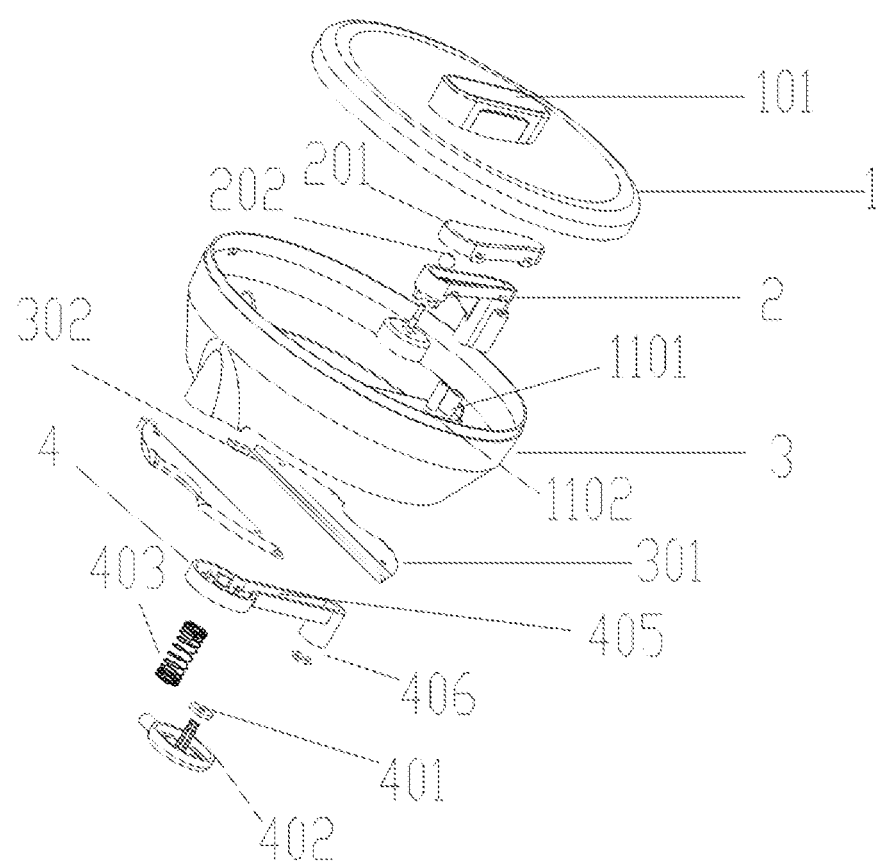
FIG. 2 is a partial exploded structural schematic diagram of the cyclic preheating coffee pot of the embodiment 1 of the present invention, primarily showing a structure of the water tank.
Figure 3:
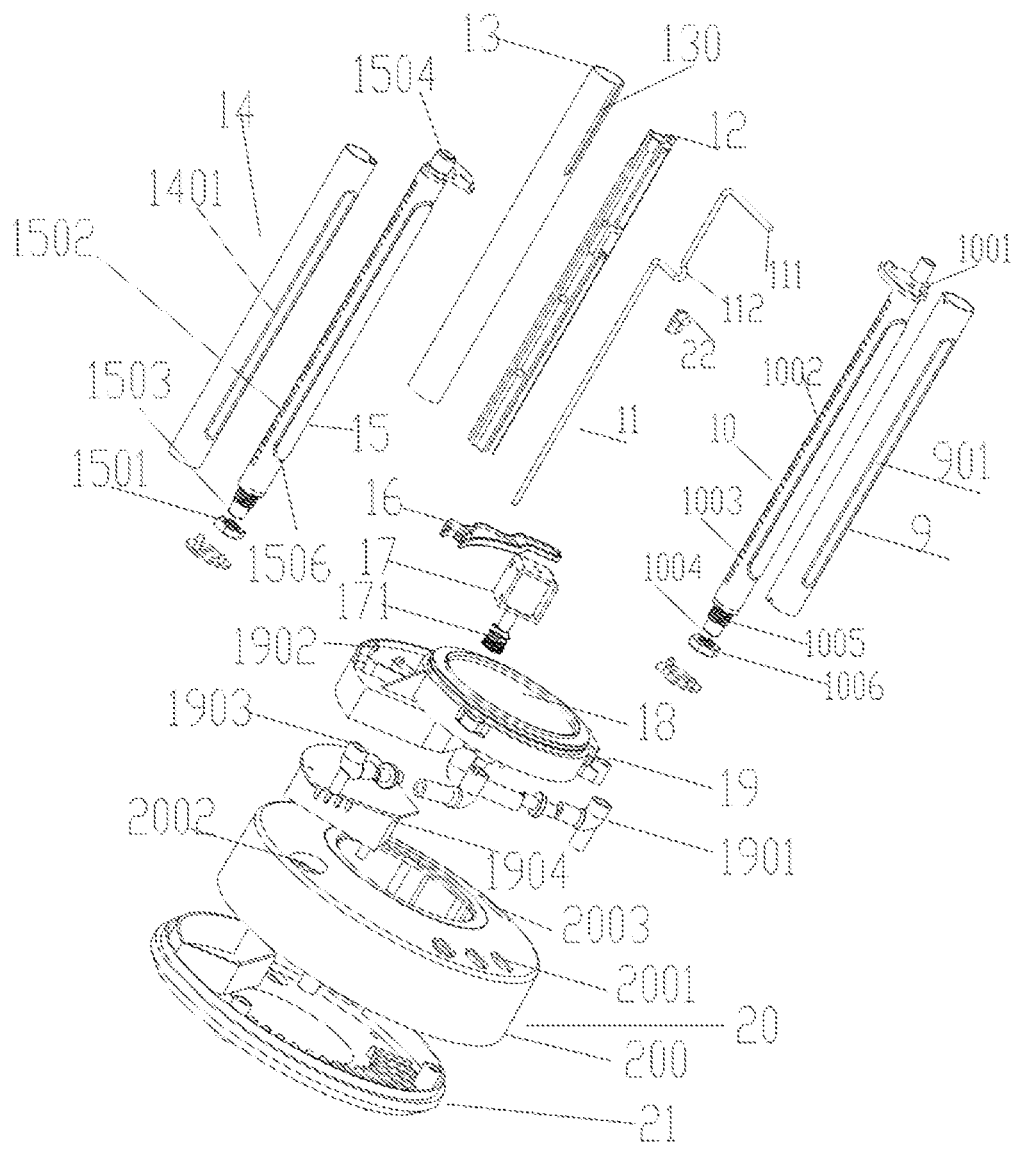
FIG. 3 is a partial exploded structural schematic diagram of the cyclic preheating coffee pot of the embodiment 1 of the present invention, primarily showing a structure of the assembly below the water tank.
Figure 4:
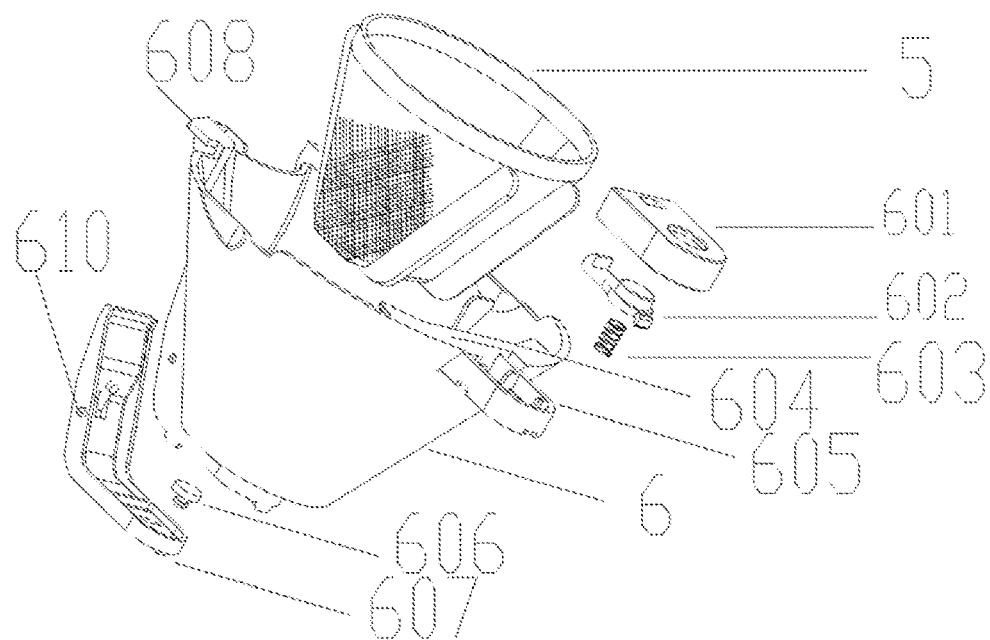
FIG. 4 is an exploded structural schematic diagram of a brewing cavity of the cyclic preheating coffee pot of the embodiment 1 of the present invention.
Figure 5:
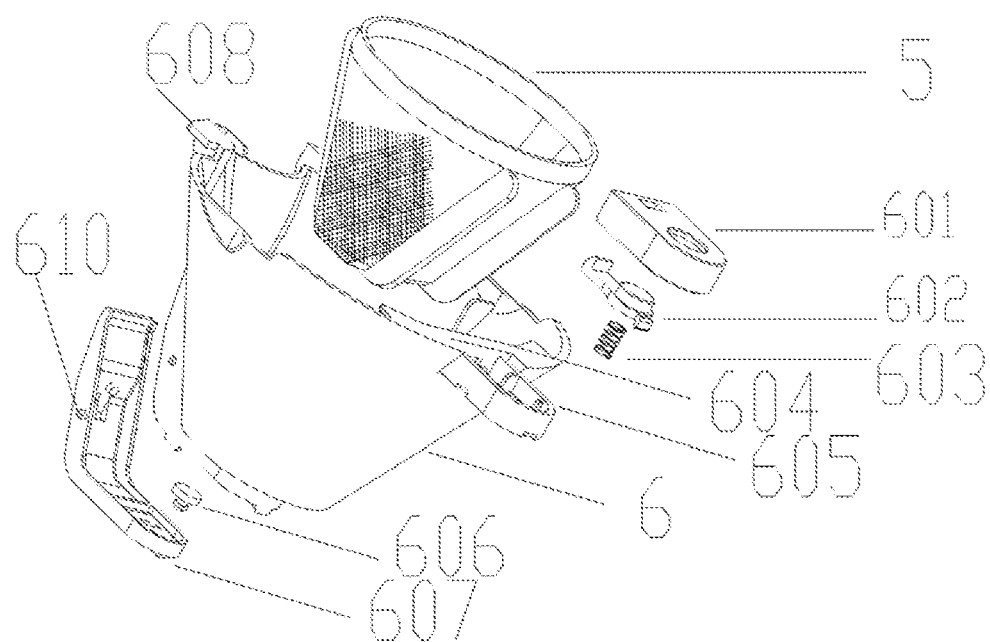
FIG. 5 is an exploded structural schematic diagram of a preheating water outlet element of the cyclic preheating coffee pot of the embodiment 1 of the present invention.
Figure 6:
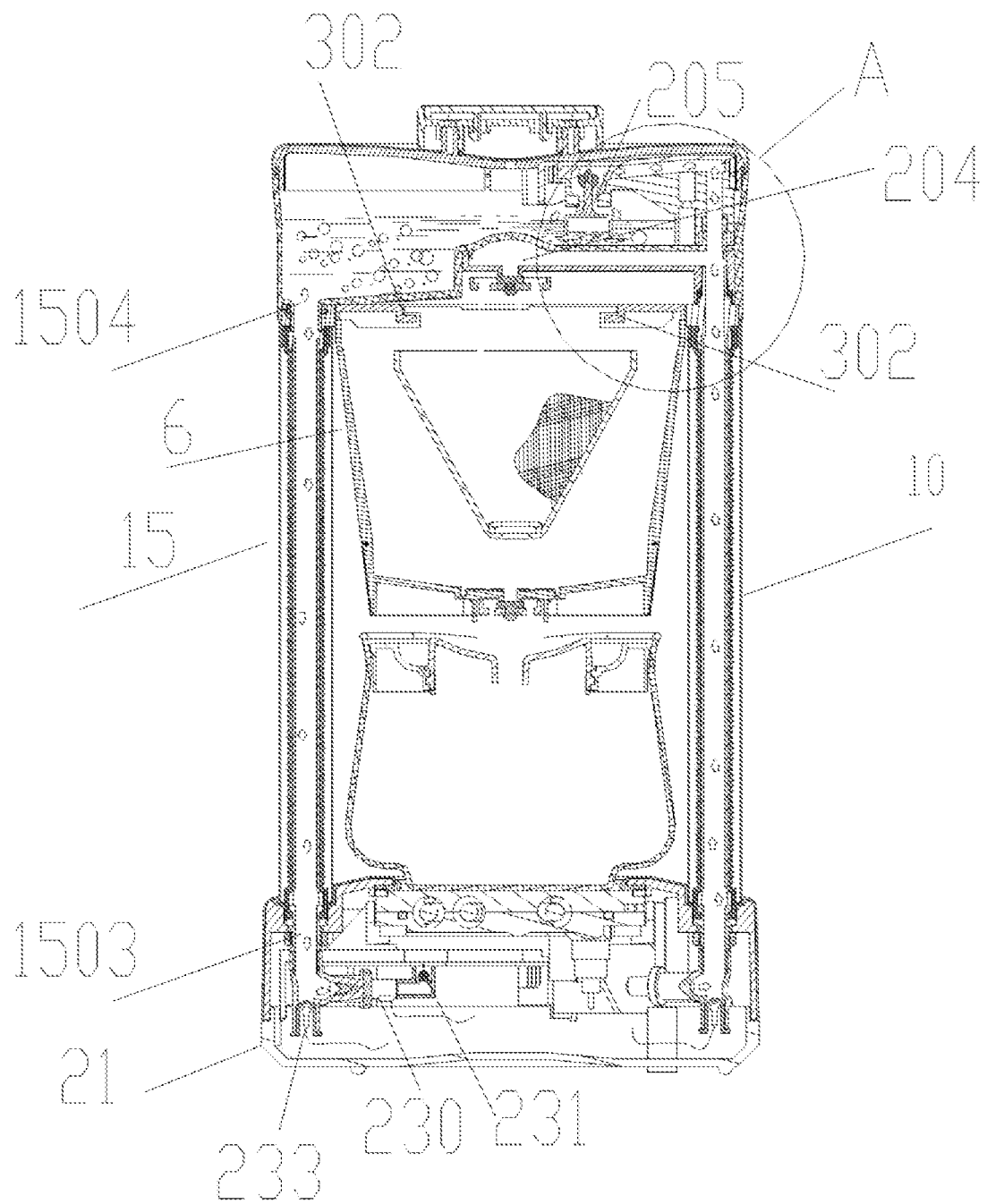
FIG. 6 is a diagram of a working state of the cyclic preheating coffee pot of the embodiment 1 of the present invention.
Figure 7:
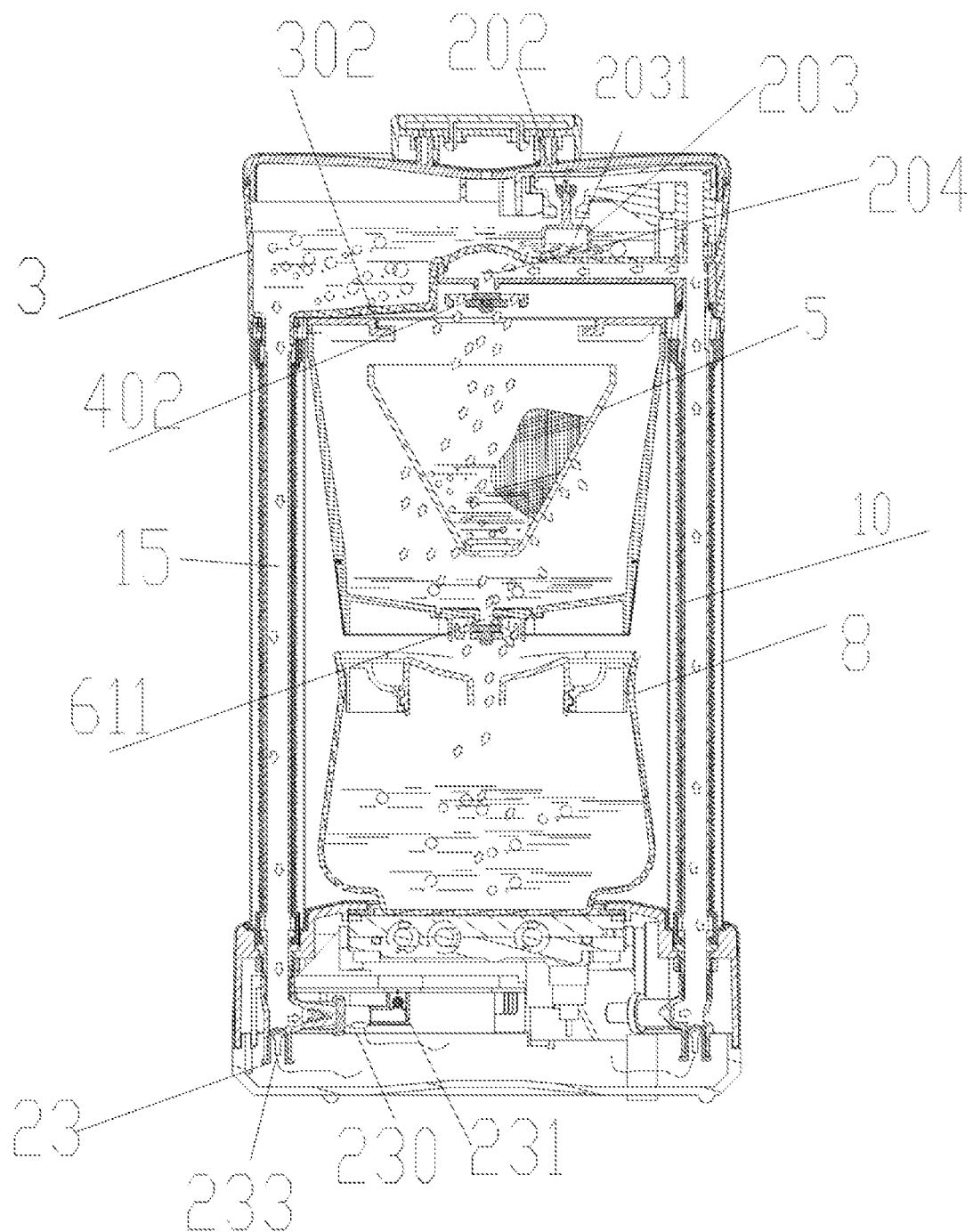
FIG. 7 is a diagram of the working state of the cyclic preheating coffee pot of the embodiment 1 of the present invention when the second water outlet and the discharge outlet are opened.
Figure 8:
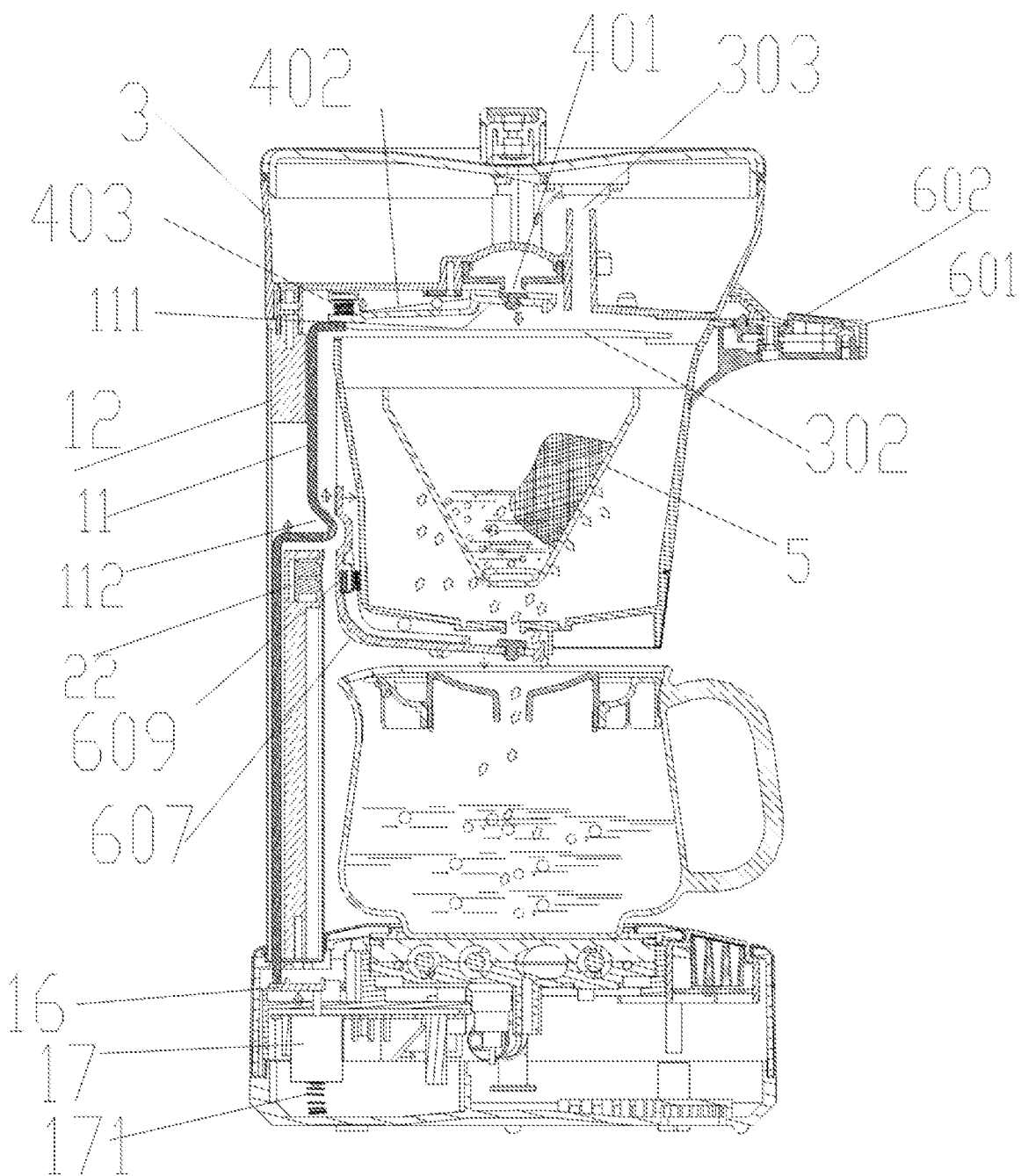
FIG. 8 is a diagram of the working state of the cyclic preheating coffee pot of the embodiment 1 of the present invention.

Further description of the present invention will be made below in combination with drawings. The drawings are merely used for exemplary description and are not construed as limitation to the patent. In order to better describe the embodiments, some parts in the drawings will be omitted, amplified or lessened and the drawings do not represent the dimensions of actual products. Those skilled in the art can understand that some known structures and description thereof in the drawings may be omitted.

Embodiment 1

Figure 9:
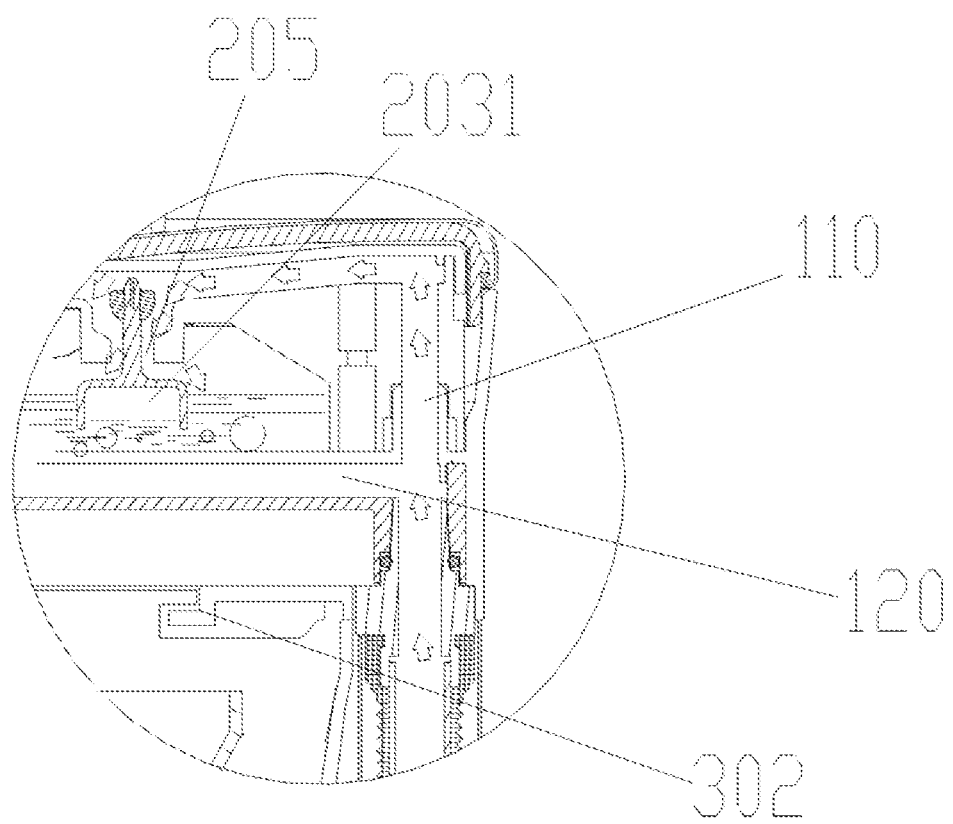
FIG. 9 is a partial enlarged drawing of area A in the FIG. 6.
Figure 10:
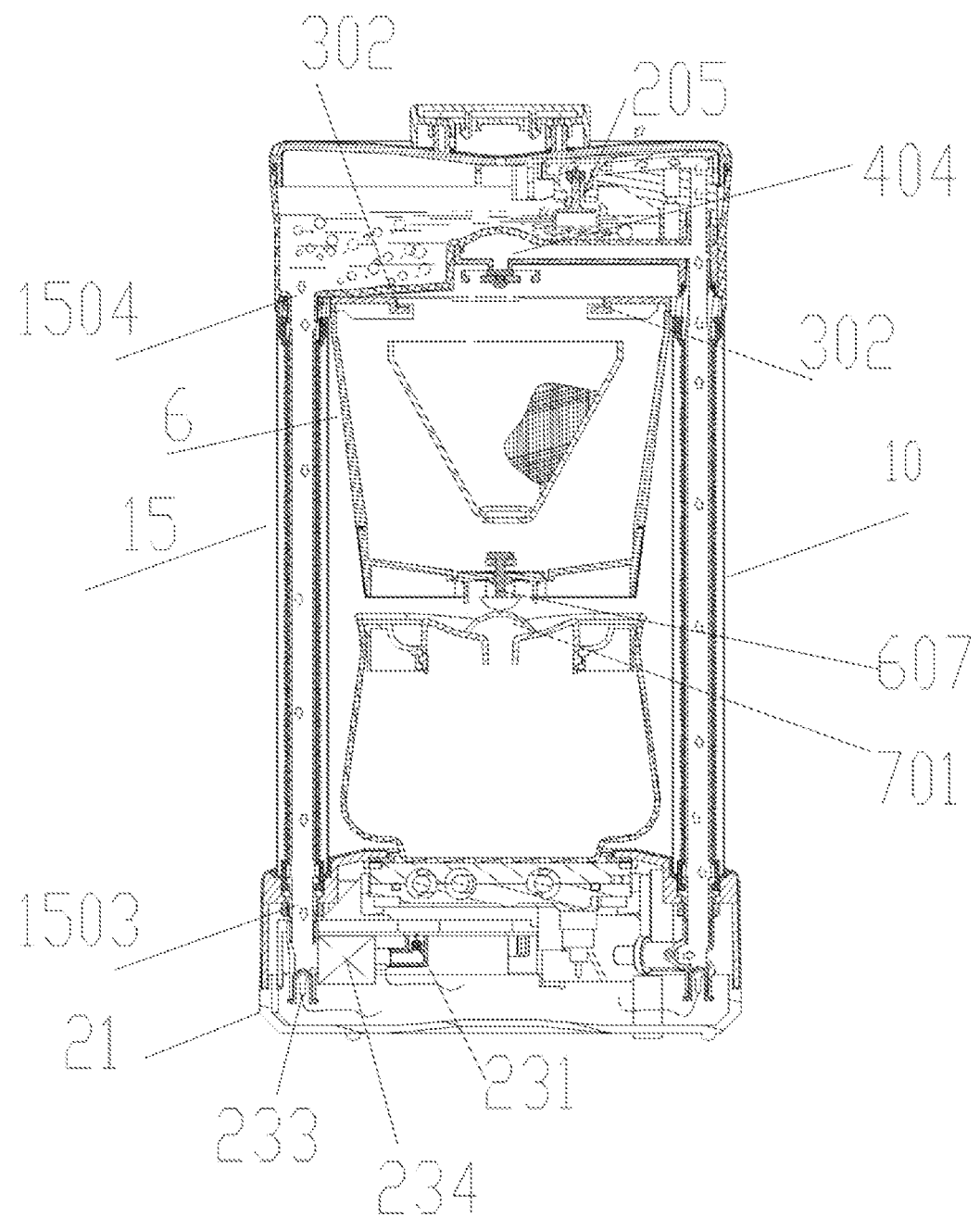
FIG. 10 is a section view structural schematic diagram of the cyclic preheating coffee pot of the embodiment 2 of the present invention.
Figure 11:
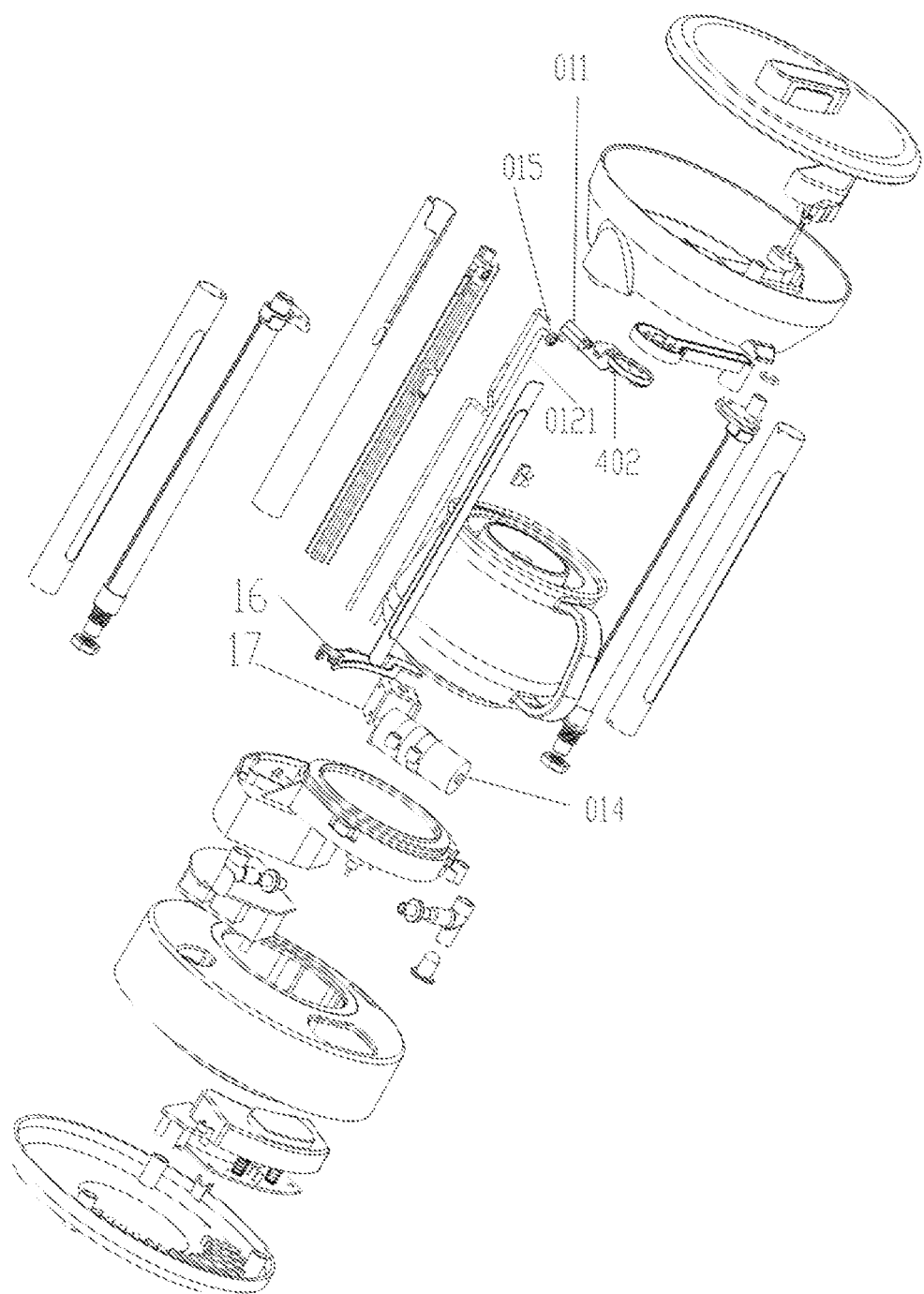
FIG. 11 is an exploded structural schematic diagram of the cyclic preheating coffee pot of the embodiment 3 of the present invention.
Figure 12:
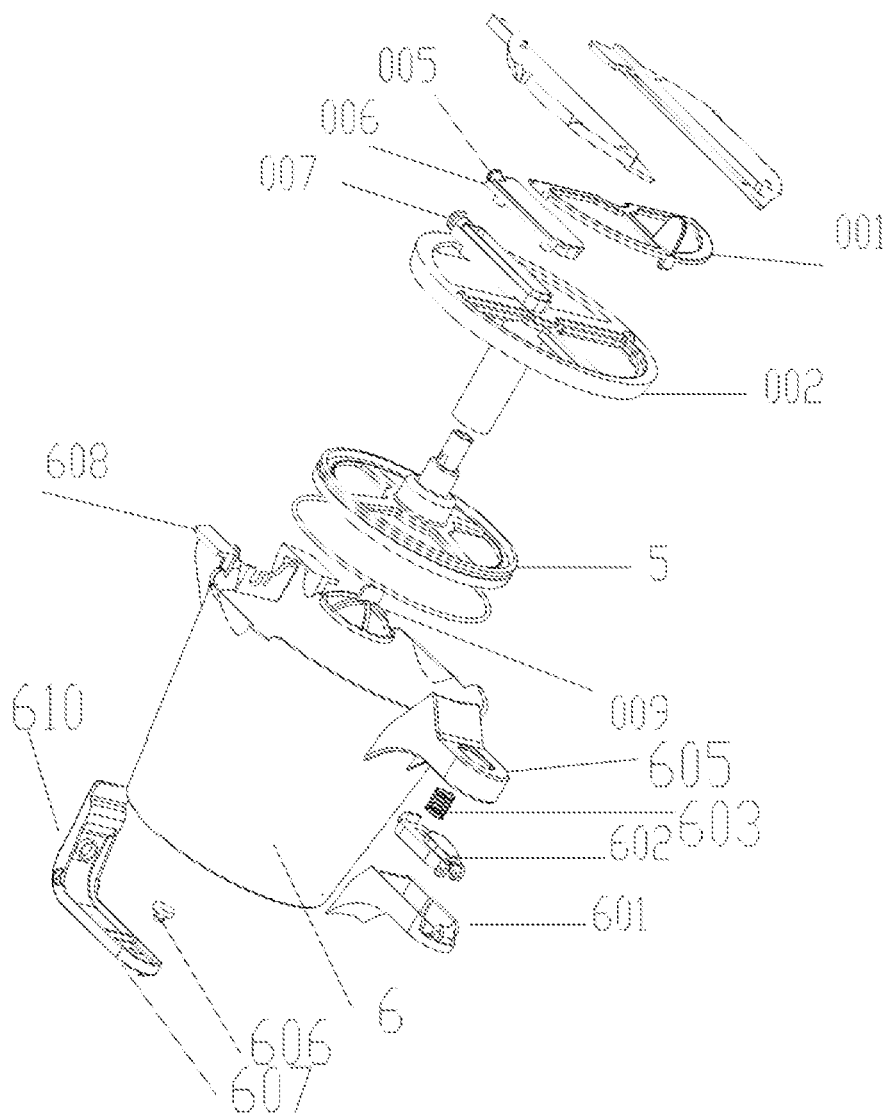
FIG. 12 is a partial exploded structural schematic diagram of the cyclic preheating coffee pot of the embodiment 3 of the present invention.
Figure 13:
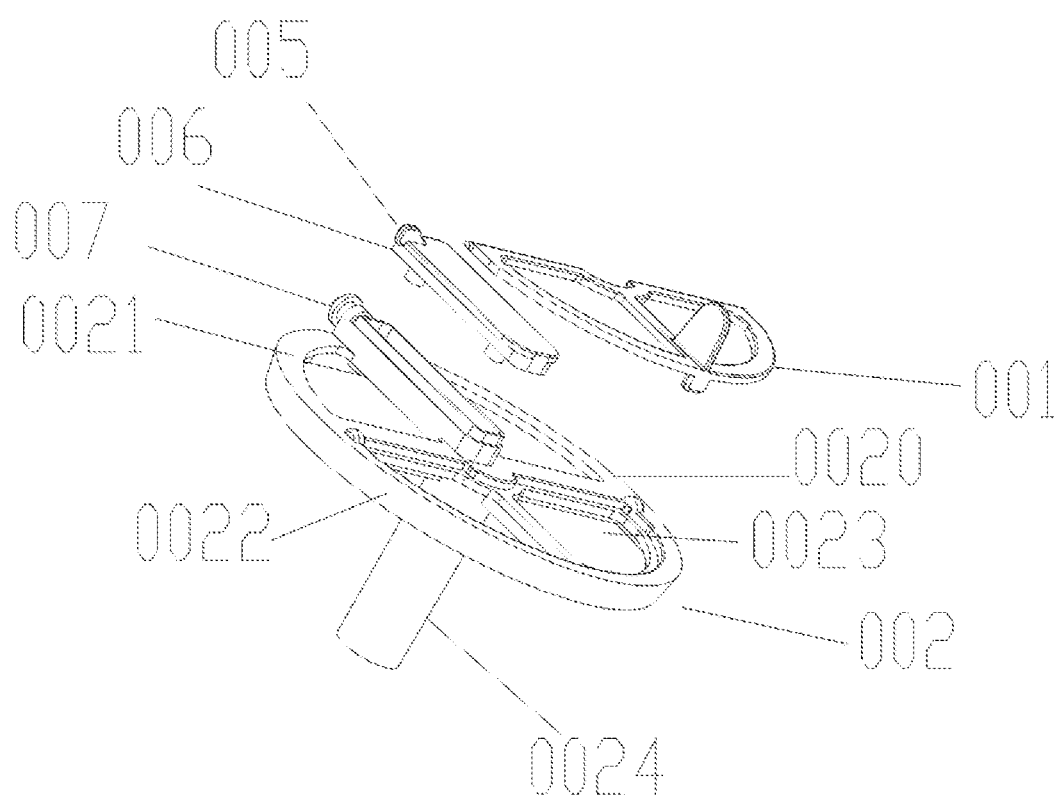
FIG. 13 is an exploded structural schematic diagram of the brewing cavity cap of the cyclic preheating coffee pot of the embodiment 3 of the present invention.
Figure 14:
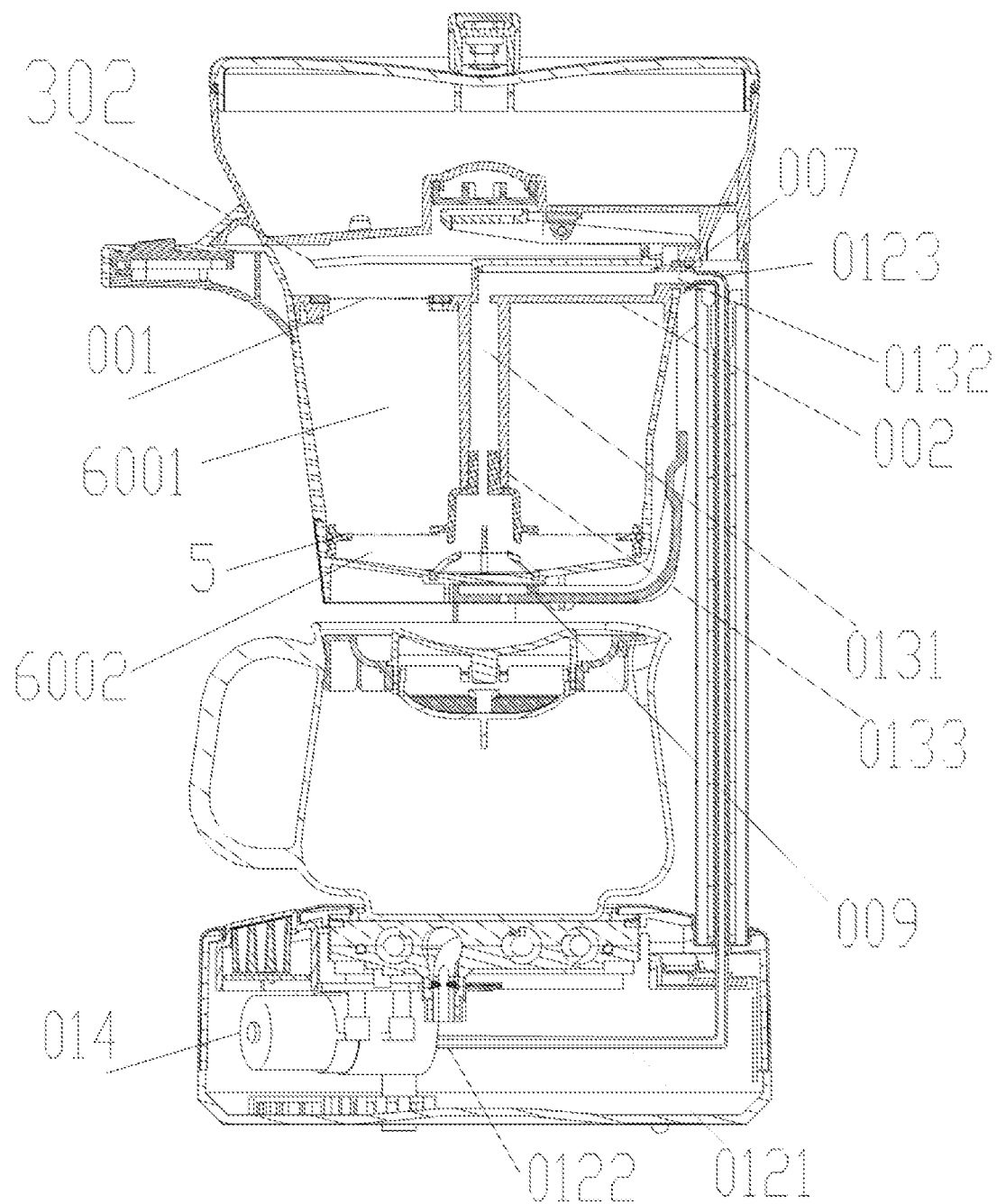
FIG. 14 is a section view structural schematic diagram of the cyclic preheating coffee pot of the embodiment 3 of the present invention.
Figure 15:
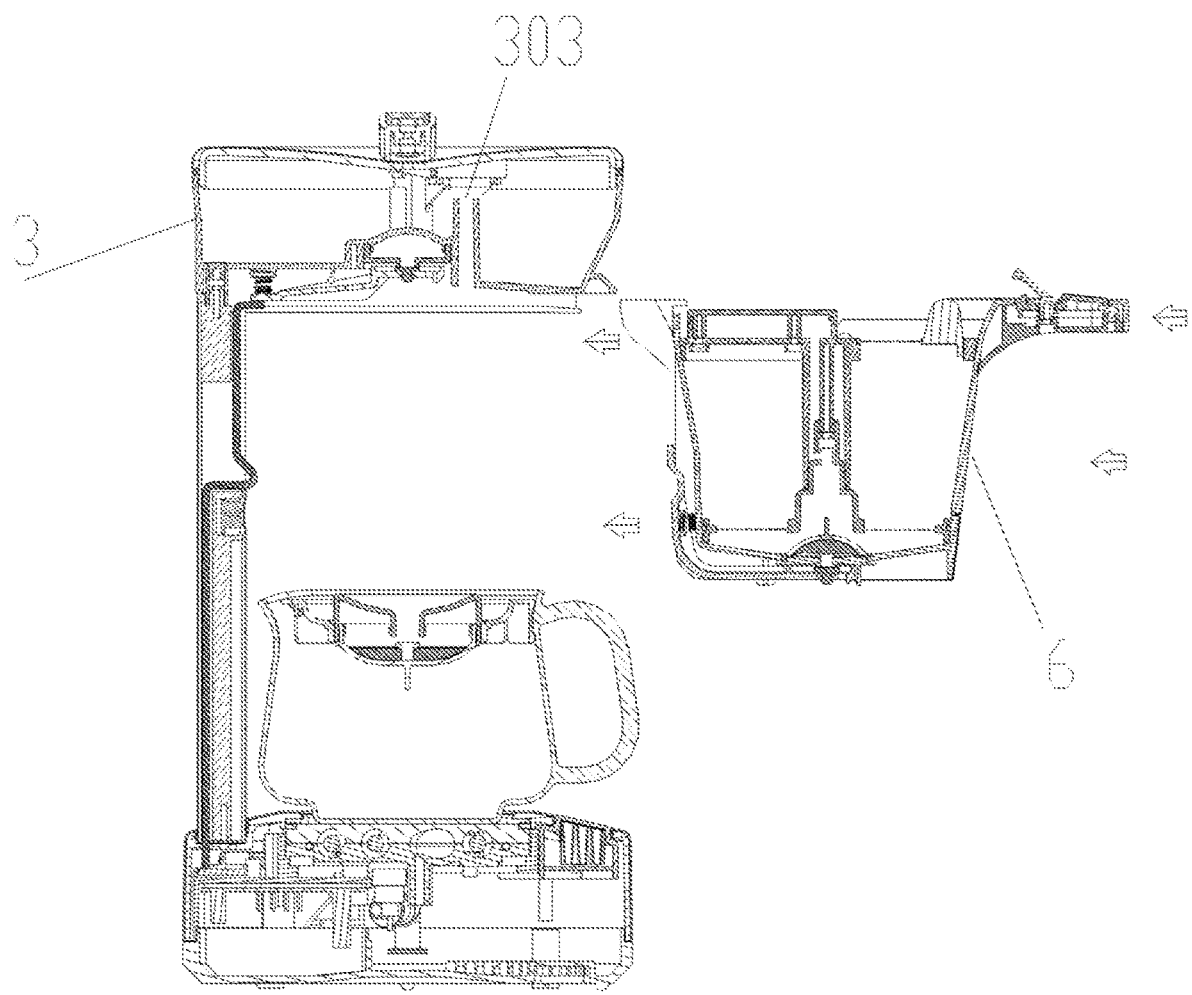
FIG. 15 is a diagram of a mounting state of the brewing cavity of the cyclic preheating coffee pot of the embodiment 3 of the present invention.

As shown in the FIG. 1 and FIG. 9, a cyclic preheating coffee pot includes a main body, a brewing cavity 6, a water supply apparatus, a heating apparatus 18, a water inlet pipe 15 and a water outlet pipe 10 mounted on the main body respectively, and further includes a control apparatus, a driving apparatus and a flow dividing structure mounted on the main body. In the present embodiment, the main body includes the base 20. The water supply apparatus includes the water tank 3 fixed above the base 20. The water tank 3 is communicated with the heating apparatus 18 via the water inlet pipe 15. The water tank 3 is configured to supply water to the heating apparatus 18 via the water inlet pipe 15. The first end 1004 of the water outlet pipe 10 is communicated with the heating apparatus 18 and the second end 1001 of the water outlet pipe 10 is communicated with the flow dividing structure. The flow dividing structure includes the first branch 110 and the second branch 120. The water outlet pipe 10 is communicated with the water tank 3 via the first branch 110, such that the water tank 3, the water inlet pipe 15, the heating apparatus 18, the water outlet pipe 10 and the first branch 110 are communicated in sequence and can form the cyclic pipeline. The cyclic pipeline is provided with the one-way valve apparatus 231 to define a direction of a water flow. The heating apparatus 18 is used for preheating or heating water flowing into the heating apparatus 18. The second branch 120 is provided with the water outlet switch 402, and the water outlet switch 402 is used for opening or closing the second branch 120, such that when the water outlet switch 402 is turned on, the water outlet pipe 10 is communicated with the brewing cavity 6 via the second branch 120, and when the water outlet switch 402 is turned off, the water outlet pipe 10 is not communicated with the brewing cavity 6. The control apparatus is electrically connected with the driving apparatus, and the control apparatus is configured to control the driving apparatus, such that the driving apparatus drives the water outlet switch 2 to be turned on, and thus, water flows through the second branch 120 from the water outlet pipe 10 to enter the brewing cavity 6. The flow dividing structure is provided with the water inlet 406, the first water outlet 205 and the second water outlet 404. The water inlet 406 is communicated with the first water outlet 205 to form the first branch 110 and the water inlet 406 is communicated with the second water outlet 404 to form the second branch 120.

Specifically, the water tank 3 is provided with a water tank opening and a water tank upper cap 1, the water tank upper cap 1 covers the water tank opening, and the water tank upper cap 1 is provided with the handle 101. The bottom portion of the water tank 3 is provided the transversely extending second channel 1102 and is further provided with the first channel 1101 communicated with the second channel 1102 and penetrating through the bottom portion of the water tank 3, such that the first channel 1101 is communicated with the water tank 3. Specifically, in the present embodiment, a first groove opened downward is formed in an outer surface of the bottom portion of the water tank 3. The bottom portion of the water tank 3 is correspondingly provided with a water outlet spray head 4. A second groove 405 opened upwards is formed in the water outlet spray head 4 corresponding to the first groove, and the position of the water outlet spray head 4 corresponding to the first groove is combined with the bottom portion of the water tank 3 so as to form the flow dividing structure, wherein the first groove and the second groove 405 are combined to form the second channel 1102. In the present embodiment, the flow dividing structure further includes the hollow water outlet element 2 located in the water tank, and the hollow water outlet element is provided with the hollow water outlet element outlet 205 and the hollow water outlet element inlet 206. In the embodiment, the hollow water outlet element outlet 205 serves as the first water outlet 205 of the flow dividing structure. The hollow water outlet element inlet 206 is connected with the first channel 1101 in a sleeved manner. The hollow water outlet element outlet 205 is provided with the reflux switch 202. The reflux switch 202 is a movable valve 202, and the movable valve 202 is used for opening or closing the hollow water outlet element outlet 205. A lower side of the movable valve 202 is further provided with a floating element 203 and the movable valve 202 is fixedly connected with the floating element 203. The floating element 203 is provided with a floating element cavity 2031 or the floating element 203 can be made from a material with a density less than that of water, such that when the water level of the water tank is raised, the floating element can move upwards by means of buoyancy of water to push the movable valve 202 to move upwards to open the hollow water outlet element outlet 205. The water outlet spray head 4 is provided with the second water outlet 404, and the second water outlet 404 is provided with the water outlet switch 402. Specifically, the water outlet switch 402 is the water outlet valve 402, and a water outlet valve spring 403 is arranged between the water outlet valve 402 and the bottom portion of the water tank 3. One end of the water outlet valve 403 is located at the second water outlet 404 and the other end of the water outlet valve is connected with the driving apparatus. A sealing element 401 is further arranged between the water outlet valve 402 and the second water outlet 404. The water tank 3 is further provided with an overflow port 303 for discharging steam and excessive to-be-heated cold water.

In order to position the water outlet pipe 10 and the water inlet pipe 15, and further to prevent the user from being scalded as the user is in direct contact with the water outlet pipe 10 and the water inlet pipe 15, a first positioning column pipe sleeve 9 is arranged outside the water outlet pipe 10 in a sleeving manner, and a third positioning column pipe sleeve 14 is arranged outside the water inlet pipe 15 in a sleeving manner. In order to observe the water levels in the water outlet pipe 10 and the water inlet pipe 15 or flow of water, the water outlet pipe 10 and the water inlet pipe 15 are made from a transparent material, and the first positioning column pipe sleeve 9 and the third positioning column pipe sleeve 14 are provided with a first pipe hole 901 and a third pipe hole 1401 respectively, and therefore, conditions of water in the water outlet pipe 10 and the water inlet pipe 15 can be observed via the first pipe hole 901 and the third pipe hole 1401. Corresponding to the first pipe hole 901, a front portion of the water outlet pipe 10 is provided with a first watch position 1003. Corresponding to the third pipe hole 1401, a front portion of the water inlet pipe 15 is provided with a third watch position 1403. Meanwhile, back portions of the water outlet pipe 10 and the water inlet pipe 15 are provided with refracting surfaces 1002 and 1502 respectively. The water inlet pipe 15 is provided with a first end 1504 of the water inlet pipe and a second end 1503 of the water inlet pipe, and the water outlet pipe 10 is provided with a first end 1004 of the water outlet pipe and a second end 1001 of the water outlet pipe. The first end 1004 of the water outlet pipe and the second end 1503 of the water inlet pipe are further provided with threads and nuts 1006 and 1501 corresponding to the threads respectively.

The driving apparatus includes the driving element 11 and the electromagnetic valve 17, the electromagnetic valve 17 is arranged on the base 20, and the electromagnetic valve 17 is connected with the driving element 11 and is used for driving the driving element 11 to move. Specifically, the driving element 11 is a driving rod 11. An upper end of the driving rod 11 extends transversely to form the first driving portion 111 and a rod body of the driving rod 11 is provided with the transversely protruding second driving portion 112. Specifically, the base 20 includes the base shell 200 and the bottom cap 21, and the electromagnetic valve 17 is elastically arranged on the bottom cap 21 via the third spring 171 and the bottom cap 21 is further provided with the supporting rack 19. A driving wane 16 is arranged below the driving rod 11, one end of the driving teeterboard 16 is rotatably connected with a hinge portion 1902 of a supporting rack 19 and the other end of the driving teeterboard is placed on the electromagnetic valve 17. When the electromagnetic valve 17 is powered on and works, the electromagnetic valve 17 moves upwards to push the teeterboard 16 to move upwards around the hinge portion 1902, such that the driving rod 11 is heightened and thus, the driving rod 11 moves upwards. A middle portion of the driving teeterboard 16 is provided with a driving recess. The driving recess is movably connected with the bottom portion of the driving rod 11. The driving recess can limit the driving rod to keep the driving rod 11 to move longitudinally without being locked. A bottom portion of a driving shaft of the electromagnetic valve 17 is provided with the third spring 171, and an elastic force of the third spring 171 counteracts a part of gravity of the driving rod 11 to assist the driving shaft of the electromagnetic valve 17 to overcome resistance to jack the driving rod 11 when ascending. The water outlet valve spring 403 or the second spring 609 is driven to be compressed simultaneously.

In the present embodiment, a supporting column 12 is further arranged between the water tank 3 and the base 2, the supporting column 12 is provided with a groove matched with the driving rod 11, and the driving rod 11 is embedded into the supporting column 12 via the groove and moves on the supporting rod 12. In order to position the supporting column and beautify as well, the second positioning column pipe sleeve 13 is further arranged outside the supporting column 12 in a sleeving manner. The second positioning column pipe sleeve 13 is further provided with a sliding chute 130, such that the first driving portion 111 and the second driving portion 112 move outside the second positioning column pipe sleeve 13 via the sliding chute 130.

A lower portion of the supporting rack 19 is provided with a water outlet pipe joint 1901 and a water inlet pipe joint 1903. The supporting rack 19 is provided with the heating apparatus 18. The first end 1004 of the water outlet pipe is connected with the water outlet pipe joint 1901 so as to be further communicated with the heating apparatus 18, and the water inlet pipe 15 is connected with the water inlet pipe joint 1903 so as to be further communicated with the heating apparatus 18. The supporting rack 19 is further provided with the power supply board 1904. The base shell 200 is further provided with a water inlet pipe mounting hole 2002, a water outlet pipe mounting hole 2003 and a button 2001. During mounting, the water inlet pipe 10 penetrates through the water outlet pipe mounting hole 2003 and is connected with the water outlet pipe joint 1901, and the water inlet pipe 15 penetrates through the water inlet pipe mounting hole 2002 and is connected with the water inlet pipe joint 1903. The supporting rack is further provided with a heating apparatus inlet and a heating apparatus outlet. The heating apparatus inlet is connected with the water outlet pipe joint 1901 and the heating apparatus outlet is connected with the water inlet pipe joint 1903. The control apparatus includes the first temperature controller 230 arranged on the water inlet pipe joint 1903. The first temperature controller 230 is arranged at the front end of the one-way valve apparatus 231 to measure the temperature of water before entering the heating apparatus 18, i.e., the temperature close to the water tank. An inlet of the heating apparatus is provided with the one-way valve apparatus 231, and the one-way valve apparatus 231 blocks high-temperature water flowing backwards due to expansion of hot water when the heating apparatus 18 heats the water so as to prevent misjudgment by the first temperature controller 230. The heating apparatus 18 is further provided with the second temperature controller 232. The second temperature controller 232 is used for controlling the working state of the heater so as to prevent dry burning caused by overtemperature of the heating apparatus. When the heating apparatus reaches the set temperature, the second temperature controller 232 controls the heating apparatus to stop working. The bottom cap 21 is provided with a water level lamp 233, and the water level lamp 233 is covered by lampshade 23. The water level lamp 233 and the lampshade 23 are located below the water inlet pipe 15 and the water outlet pipe 10. When the lamp is turned on, a condition of water flowing in the water inlet pipe 15 and the water outlet pipe 10 or bubbles can be seen clearly, such that the ornamental value is improved. Thus, in the embodiment, the water outlet pipe 10, the supporting column 12 and the water inlet pipe 15 connect the water tank 3 to the base 20 fixedly. Lower ends of the water inlet pipe 15 and the water outlet pipe 10 are provided with threads respectively. The threads and the nuts are adaptively and fixedly connected to the base 20 in a fit manner. The lower end of each of the threads is provided with a silica gel hose joint for tight connection. The lower end of the silica gel hose joint is provided with the lampshade 23 and the water level lamp 233. A ray of the water level lamp is pointed to hollow positions of the water inlet pipe 15 and the water outlet pipe 10, and rear walls of the water inlet pipe 15 and the water outlet pipe 10 are provided with transverse corner edge grains or corner edge surfaces to refract rays. The ray of the water level lamp is pointed to descending bubbles in the water inlet pipe 15 and ascending bubbles in the water outlet pipe 10. The refracted rays of the bubbles are observed and appreciated via the first pipe pore 901 and the third pipe pore 1401, and main bodies of the water inlet pipe 15 and the water outlet pipe 10 are longitudinally arranged between the water tank 3 and the base 20. In other embodiments, the main bodies of the water inlet pipe 15 and the water outlet pipe 10 can be longitudinally arranged on one side of the water tank 3 or the brewing cavity 6.

The bottom portion of the water tank 3 is provided with a sliding chute element 301 and a sliding chute 302. The brewing cavity 6 is arranged below the water tank 3. The upper portion of the brewing cavity 6 is slidably connected with the bottom portion of the water tank 3 via the sliding chute element 301. The bottom portion of the brewing cavity 6 is provided with the discharge outlet 611 for discharging coffee. The brewing cavity 6 is provided with the first filtering element 5, and the first filtering element 5 is configured to enable the coffee to be filtered by the first filtering element 5 before flowing out of the brewing cavity 6 via the discharge outlet 611. An opened edge of the brewing cavity 6 is provided with a lug 608 corresponding to the sliding chute 302, and the lug 608 can move along a length direction of the sliding chute 302 and is inserted into the sliding chute 302. Therefore, the brewing cavity 6 can be connected with the water tank 3 in an inserted manner as the lug 608 is matched with the sliding chute 302, such that the brewing cavity is suspended below the water tank 3. In order to take the brewing cavity 6 easily, the opened edge of the brewing cavity 6 is provided with a brewing cavity handle 605. In order to further fix the brewing cavity 6 to the bottom portion of the water tank 3, the brewing cavity handle 605 is internally provided with a snap-fastener 602, and the bottom portion of the water tank is provided with a slot matched with the snap-fastener 602. The snap-fastener 602 is elastically arranged in the handle 605 via the first spring 603, and one end of the snap-fastener 602 is provided with a hook portion capable of being inserted into the slot. The brewing cavity handle 605 is covered by a handle cap 601. The snap-fastener 602 is provided with a pressing portion protruding upwards to penetrate through the handle cap 601. In a process of connecting the brewing cavity 6 with the water tank in an inserted manner slidably along the length direction of the sliding chute 302, when the snap-fastener 602 is moved to the slot, the hook portion of the snap-fastener 602 is inserted into the slot to be locked based on the slot, and thus, the brewing cavity 6 can be firmly mounted below the water tank. When it is necessary to take out the brewing cavity 6 from the lower side of the water tank, as if the pressing portion of the snap-fastener 602 is pressed, the hook portion of the snap-fastener 602 will be separated from the slot, such that the brewing cavity 6 slides along the length direction of the sliding groove 302 to be taken out. The front end of the sliding chute 302 is inclined, the middle portion of the sliding chute is gentle and the tail of the sliding chute protrudes to form a platform. When the brewing cavity is mounted, the lug 608 of the brewing cavity 6 enters from the front end of the sliding chute 302 and moves to the tail of the sliding chute 302, and the platform enforces the lug 608 of the brewing cavity 6 to lift to shorten a gap between the opening of the brewing cavity 6 and the bottom portion of the water tank 3, such that the handle 605 is locked to the bottom portion of the water tank 3.

The discharge outlet 611 is provided with the discharge switch 607, and the discharge switch 607 is used for opening or closing the discharge outlet 611. Specifically, the discharge switch 607 forms the rotating teeterboard 607. The rotating teeterboard 607 is provided with a bottom extending horizontally substantially and an upper portion extending upwards along the bottom. The bottom portion of the rotating teeterboard 607 is located below the discharge outlet. The rotating teeterboard 607 is located outside the brewing cavity and is rotatably connected with the bottom portion of the brewing cavity 6, and the upper portion of the rotating teeterboard 607 is elastically connected with the bottom portion of the brewing cavity 6 via the second spring 609. The upper portion of the rotating teeterboard 607 is further provided with a driving concave portion corresponding to the second driving portion 112. As a result of an elastic force of the second spring, the upper portion of the rotating teeterboard 607 is far away from the brewing cavity, thus the bottom portion of the rotating teeterboard 607 abuts against the discharge outlet 611 tightly, and therefore, the discharge outlet is closed. When the driving rod 11 is driven, the driving rod 11 moves upwards, the second driving portion 112 abuts against the driving concave portion on the upper portion of the rotating teeterboard 607 and pushes the upper portion of the rotating teeterboard 607 to be close to the brewing cavity, and the bottom portion of the rotating teeterboard 607 moves downwards from the discharge outlet 611 and therefore, the discharge outlet 611 is opened. In order to further seal the discharge outlet 611, a discharge outlet sealing element 606 is further arranged between the rotating teeterboard 607 and the discharge outlet 611. In the embodiment, the discharge outlet sealing element 606 is fixed to the bottom portion of the rotating teeterboard 607.

The container 8 for holding the coffee liquid is further arranged below the brewing cavity 6. The container 8 is located below the discharge outlet 611. The container 8 is provided with the container opening, and the container opening is provided with the third filtering element 7. The container 8 is a cup with a handle in the present embodiment, and it is convenient for the user to take. The container 8 can be placed on the base 20 and can be taken away from the base 20 according to a user demand. The cyclic preheating coffee pot in the embodiment further includes a cup probe 22 mounted on the supporting column.

The working method of a cyclic preheating coffee pot of the embodiment includes the following steps: a, adding coffee powder into the brewing cavity 6; b, adding water into the water supply apparatus; c, starting the heating apparatus 18, wherein the water flows cyclically in the cyclic pipeline and is preheated by the heating apparatus; and d, controlling, by the control apparatus, the driving apparatus to start when water in the water supply apparatus 18 is preheated to the set temperature, and driving, by the driving apparatus, the water outlet switch 402 to be turned on, wherein the water flows through the second branch 120 from the water outlet pipe 10 to enter the brewing cavity 6.

Specifically, a working principle of the cyclic preheating coffee pot of the present embodiment is as follow: the coffee powder is put in the brewing cavity 6, the brewing cavity 6 is connected with the bottom portion of the water tank 3 in an inserted manner to fix the brewing cavity 6. The water tank upper cap 1 is opened and water is added into the water tank 3. Cold water (usually water at room temperature) flows into the water inlet pipe 15 and the heating apparatus in sequence from the water tank 3 (usually water at room temperature). In the water adding process, the water level of the water tank ascends, and the floating element ascends to push the movable valve 202 to move upwards to open the hollow water outlet element outlet 205. The heating apparatus is started, such that the heating apparatus starts to heat. Water in the heating apparatus is heated to expand in volume, and the water is lessened in density and lightened and the water level will be raised. Furthermore, limited by the one-way valve apparatus 231, the water in the heating apparatus 18 cannot flow back to the water inlet pipe 15 and thus, the water in the heating apparatus 18 cannot flow to the water outlet pipe 10 to enter the flow dividing structure. At the moment, the second water outlet 404 is closed, and the water only can flow to the hollow water outlet element 2 along the second channel 1102 and flow out from the hollow water outlet element outlet 205 and enter the water tank 3. The water returning to the water tank flows into the water inlet pipe 15 again, such that the water is cyclically preheated in sequence in the cyclic pipeline. The first temperature controller 230 controls the preheating temperature of the water tank 3. When the water tank 3 reaches the preset temperature, the first temperature controller 230 works and sends the signal to the power supply board 1904, and the power supply board 1904 supplies power to the electromagnetic valve 17 to work. The electromagnetic valve 17 drives a driven position 113 of the driving rod 11, and the driving rod 11 moves upwards integrally. The first driving portion 111 and the second driving portion 112 on the driving rod 11 drive the water outlet valve 402 and the rotating teeterboard 607 simultaneously to open the second water outlet 404 and the discharge outlet 611 to discharge water. At the moment, the water in the water outlet pipe 10 is hot water, the temperature of which is higher than the temperature of water in the water tank. The hot water in the water outlet pipe flows through the second channel 1102 of the flow dividing structure and flows into the brewing cavity 6 from the water outlet 404 to make coffee. At the moment, the water level of the water tank is reduced, and the movable valve 202 closes the hollow water outlet element outlet 205 due to self gravity. Thus, the hot water in the water outlet pipe 10 cannot flow back to the water tank 3 and only can flow out from the second water outlet 404. As the discharge outlet 611 is also opened, the hot water enters the brewing cavity 6 to make coffee and can flow to the cup 8 from the discharge outlet 611 immediately after being filtered by the first filtering element. The water is filtered by the third filtering element before flowing into the cup 8. When the heating apparatus reaches the set temperature, the second temperature controller controls the heating apparatus to stop working, and therefore, the heating apparatus stops heating.

Embodiment 2

The embodiment is substantially same with the embodiment 1, and the embodiment is different from the embodiment 1 that the specific structures of the driving apparatus and the discharge switch 607 are different. In addition, the water pump 234 is additionally arranged based on the embodiment 1. Specifically, in the embodiment, the driving apparatus is substantially same with that in the embodiment 1. Although the driving element is still the driving rod 11, the driving rod 11 in the present embodiment is only provided with the first driving portion 111 at the upper end for driving the water outlet switch 404. In the embodiment, the discharge switch 607 is a movable valve body arranged at the discharge outlet. A position of the third filtering element 7 on the cup 8 corresponding to the valve body is provided with a driving convex portion 701 for driving the valve body to move upwards to open the discharge outlet. Thus, when the cup 8 is placed on the base 20, the valve body is jacked by the driving convex portion 701 so as to open the discharge outlet. In addition, the water pump 234 is additionally arranged on the water inlet pipe joint 1903 for pumping water to the heating apparatus, such that the water flows back to the water tank 3 or the brewing cavity 6 via the heating apparatus 18, the water outlet pipe 10 and the flow dividing structure.

Embodiment 3

The embodiment is substantially same with the embodiment 1, and the embodiment is different from the embodiment 1 that the air supply apparatus 014 and the air guide part are further added and the brewing cavity and related assemblies of the brewing cavity are slightly different. The air supply apparatus 014 is an air pump 014. The first filtering element 5 divides the brewing cavity 6 into a dissolving chamber 6001 located in the upper portion of the brewing cavity 6 and a filter chamber 6002 located in the lower portion of the brewing cavity 6. The second filtering element 009 is arranged between the first filtering element 5 and the discharge outlet 608 in the bottom portion of the brewing cavity 6. In the present embodiment, the first filtering element 5 and the second filtering element 009 are a first filter screen 5 and a second filter screen 009 respectively. For the convenience of cleaning, the first filtering element 5 and the second filtering element 009 is detachably mounted in the brewing cavity 6 respectively. The air guide part includes a first air guide pipe 0121 and a second air guide pipe 0131. The top portion of the brewing cavity 6 is provided with the brewing cavity opening. The first end 0122 of the first air guide pipe is communicated with the air supply apparatus 004. The second end 0123 of the first air guide pipe is separately connected with the first end 0132 of the second air guide pipe, and the second end 0133 of the second air guide pipe is inserted into the brewing cavity 6 via the brewing cavity opening. The brewing cavity opening is provided with the brewing cavity cap 002 capable of covering the brewing cavity opening, and the brewing cavity cap 002 is provided with several pores (not shown in the figure). Specifically, the brewing cavity cap 002 is a round screen cap, and the screen cap of the brewing cavity cap 002 includes a cap frame 0020 and a screen (not shown in the figure). In order to put the coffee powder in the brewing cavity 6 conveniently, the brewing cavity cap 002 is further provided with a half-round small screen cap 001. The cap frame 0020 includes a first half-round portion 0021 and a second half-round portion 0022. The first half-round portion is provided with the screen. The second half-round portion 0022 is hollowed to form an opening 0023 of the brewing cavity cap, and the second half-round portion 0022 is covered by the half-round small screen cap 001, and the half-round small screen cap 001 is a flip rotatably connected with the cap frame. Thus, when it is necessary to put the coffee powder in the brewing cavity, it can be unnecessary to take down the brewing cavity cap 002 and it is only needed to overturn the small screen cap 001 upwards, i.e., the coffee powder can be put via the opening 0023 of the brewing cavity cap on the second half-round portion 0022. The opening 0023 of the brewing cavity cap can be opened and closed by rotating the small screen cap 001. In the embodiment, meshes in the screen of the brewing cavity cap 002 and meshes in the small screen cap 001 are taken as pores in the brewing cavity cap 002.

The brewing cavity cap 002 is provided with the second air guide pipe 0131. The second air guide pipe includes the cavity and the pipe portion 0024 communicated with the cavity. The brewing cavity cap 002 is internally provided with the cavity. An air inlet joint 007 communicated with the cavity is formed in a side portion of the brewing cavity cap 002. The air inlet joint 007 can be joined with the second end 0123 of the first air guide pipe, and a middle portion of the brewing cavity cap 002 is provided with the pipe portion 0024 extending downwards, such that the pipe portion 0024 extends into the brewing cavity 6 when the brewing cavity cap 002 covers the brewing cavity opening. The second air guide pipe 0131 penetrates through the brewing cavity opening, and the second end 0133 of the second air guide pipe is arranged in a position in the brewing cavity 6 lower than a middle portion of the brewing cavity 6.

The second air guide pipe 0131 penetrates through the brewing cavity cap 002 and penetrates through the dissolving chamber 6001 and is connected with the first filtering element 5 and is communicated with the filter chamber 6002 via the first filtering element 5. The brewing cavity cap 002 is provided with a cold water driving portion 005, a second air guide pipe cap 006 and an air inlet joint 007. The air inlet joint 007 is communicated with the air outlet joint 015. At least one of the air inlet joint 007 and the air outlet joint 015 is made from a flexible material.

A coffee cup 8 for holding coffee is further arranged below the filter chamber 6002, the coffee cup 8 is provided with the third filtering element 7 for filtering coffee and the third filtering element 7 is separately connected with the coffee cup 8. The third filtering element 7 in the present embodiment is the third filter screen 7. The small screen cap 001 is rotated upwards to open the opening the brewing cavity cap 002, such that the coffee powder can be put in the brewing cavity. The brewing cavity 6 is slidably connected with the bottom portion of the water tank 3. When the brewing cavity 6 is connected to the bottom portion of the water tank 3 in position, the cold water driving portion 005 on the brewing cavity cap 002 starts the water outlet switch 402 to be turned on, and the water tank 3 thus supplies water to the brewing cavity 6 and the water enters a position between the brewing cavity cap 002 and the first filtering element 5. The air pump 014 is started to work, and the gas enters the dissolving chamber 6001 via the first air guide pipe 0121 and the second air guide pipe 0131 in sequence from the air pump 014. The gas in the lower portion of the first filtering element 5 enters the dissolving chamber 6001 via the meshes in the first filtering element 5. The gas flows from bottom to top to stir the coffee powder to roll and dissolve in the liquid. The air supply time is set at 5 minutes in the present embodiment. When the air supply is completed, the electromagnetic valve 17 works to drive the driving rod 1 to move upwards, and the driving portion 112 drives the discharge switch 607 to discharge coffee. The first filtering element 5 filters primarily and then the second filtering element 009 filters the coffee then. Discharged from the discharge outlet, the coffee filtered twice flows through the third filtering element 7 and is filtered for the third time to finally obtain the cold brew coffee.

It should be noted that in the present embodiment, when the cyclic preheating coffee pot of the present embodiment is used for the cold brew coffee, the heating apparatus does not work, i.e., the heating apparatus does not play preheating or heating role but only plays a circulating role. Although the heating apparatus does not heat, as the water tank 3 is located above the heating apparatus and the water outlet, by means of a siphon principle, when the water is added into the water tank, the water still flows into the water inlet pipe 15, the heating apparatus 18, the water outlet pipe 10 and the second channel 1102 of the flow dividing structure in sequence from the water tank 3 (usually water at room temperature) and flows into the brewing cavity 6 from the water outlet 404. In addition, as the first filtering element, the second filtering element and the brewing cavity cap in the present embodiment are detachably assembled on the brewing cavity, the user can mount one or more of the first filtering element, the second filtering element and the brewing cavity cap on the brewing cavity as needed, or take down the one or more of the first filtering element, the second filtering element and the brewing cavity cap on the brewing cavity from the brewing cavity. Or the first filtering element, the second filtering element and the brewing cavity cap can be various types, and the user can replace different first filtering elements, second filtering elements and brewing cavity caps as needed.

In the present embodiment, when the cyclic preheating coffee pot is used for brewing hot coffee, it is not needed to use the brewing cavity cap in the present embodiment, such that the cold water driving portion 005 is not used for opening the water outlet. The first driving portion 111 drives the water outlet switch 402 to open the water outlet. Certainly, in other embodiments, it is not needed to arrange the cold water driving portion 005 on the brewing cavity cap but to control the driving apparatus to drive the water outlet switch by means of a button and the control apparatus. In the field, the driving apparatus controlled by using the button and the control apparatus belongs to common knowledge and no more detailed description is made herein.

Embodiment 4

Figure 16:
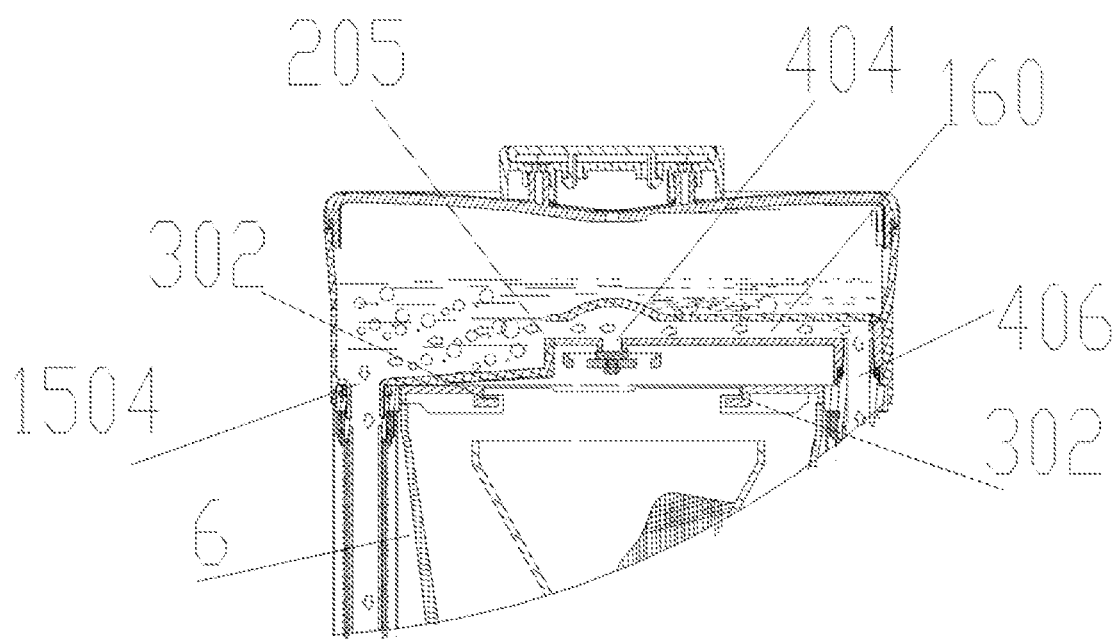
FIG. 16 is a partial schematic diagram of the cyclic preheating coffee pot of the embodiment 4 of the present invention.

The embodiment is substantially same with the embodiment 1, and the embodiment is different from the embodiment 1 that the specific structure of the flow dividing structure is slightly different. Like the embodiment 1, referring to the FIG. 1 to FIG. 9, the first end 1004 of the water outlet pipe 10 is communicated with the heating apparatus 18. The second end 1001 of the water outlet pipe 10 is communicated with the flow dividing structure. The flow dividing structure includes the first branch 110 and the second branch 120, and the water outlet pipe 10 is communicated with the water tank 3 via the first branch 110, such that the water tank 3, the water inlet pipe 15, the heating apparatus 18, the water outlet pipe 10 and the first branch 110 are communicated in sequence and can form the cyclic pipeline. The flow dividing structure is provided with the water inlet 406, the first water outlet and the second water outlet 404. The water inlet 406 is communicated with the first water outlet to form the first branch 110 and the water inlet 406 is communicated with the second water outlet 404 to form the second branch 120. However, in the present embodiment, the flow dividing structure is provided with an overall channel 160. Referring to the FIG. 16, the first branch 110 and the second branch 120 share one overall channel 160, i.e., the water inlet 406, the overall channel 160 and the first water outlet 205 form the first branch 110; and the water inlet 406, the overall channel 160 and the second water outlet 404 form the second branch 120. The overall channel 160 is arranged at the bottom portion of the water tank. One end of the overall channel 160 is provided with the water inlet 406 and the other end is provided with the first water outlet 205, and the side wall of the overall channel is provided with the second water outlet 404. The second end 1001 of the water outlet pipe 10 is communicated with the water inlet 406. The first water outlet 205 is communicated with the water tank 3 and the second water outlet 404 is located above the opening of the brewing cavity 6.

What is claimed is:

1. A cyclic preheating coffee pot, comprising a main body, a brewing cavity, a water supply apparatus, a heating apparatus, a water inlet pipe and a water outlet pipe mounted on the main body respectively, the cyclic preheating coffee pot further comprising a control apparatus, a driving apparatus and a flow dividing structure mounted on the main body, wherein the water supply apparatus is communicated with the heating apparatus via the water inlet pipe, the water supply apparatus is configured to supply water to the heating apparatus via the water inlet pipe, a first end of the water outlet pipe is communicated with the heating apparatus and a second end of the water outlet pipe is communicated with the flow dividing structure; the flow dividing structure comprises a first branch and a second branch, the water outlet pipe is communicated with the water supply apparatus via the first branch, such that the water supply apparatus, the water inlet pipe, the heating apparatus, the water outlet pipe and the first branch are communicated in sequence and a cyclic pipeline can be formed; the cyclic pipeline is provided with a one-way valve apparatus to define a direction of a water flow, or the cyclic pipeline is provided with a water pump to define the direction of the water flow; the heating apparatus is configured for preheating or heating water flowing into the heating apparatus, the second branch is provided with a water outlet switch, and the water outlet switch is used for opening or closing the second branch, such that when the water outlet switch is turned on, the water outlet pipe is communicated with the brewing cavity via the second branch, and when the water outlet switch is turned off, the water outlet pipe is not communicated with the brewing cavity, and the control apparatus is electrically connected to the driving apparatus, and the control apparatus is configured to control the driving apparatus, such that the driving apparatus drives the water outlet switch to be turned on, and therefore, water flows through the second branch from the water outlet pipe and enters the brewing cavity.

2. The cyclic preheating coffee pot according to claim 1, wherein the water supply apparatus comprises a water tank mounted on the main body, the water tank is communicated with the heating apparatus via the water inlet pipe, the water tank is configured such that a bottom portion of the water tank is higher than a bottom portion of the heating apparatus, and the water outlet pipe is communicated with the water tank via the first branch, such that the water tank, the water inlet pipe, the heating apparatus, the water outlet pipe and the first branch can form the cyclic pipeline jointly.

3. The cyclic preheating coffee pot according to claim 2, wherein the first branch is provided with a reflux switch, and the reflux switch is configured for opening or closing the first branch.

4. The cyclic preheating coffee pot according to claim 2, wherein the control apparatus comprises a first temperature controller, the cyclic preheating coffee pot further comprises a power supply board mounted on the main body, and the first temperature controller and the driving apparatus are electrically connected to the power supply board respectively.

5. The cyclic preheating coffee pot according to claim 2, wherein the brewing cavity is detachably connected to the water tank, a bottom portion of the brewing cavity is provided with a discharge outlet for discharging coffee, the brewing cavity is provided with a first filtering element, and the first filtering element is configured to enable coffee to be filtered by the first filtering element before the coffee flows out of the brewing cavity via the discharge port.

6. The cyclic preheating coffee pot according to claim 5, wherein the driving apparatus comprises a driving element, a motor or an electromagnetic valve, the motor or the electromagnetic valve is arranged on the main body, and the motor or the electromagnetic valve is connected to the driving element for driving the driving element to move.

7. The cyclic preheating coffee pot according to claim 6, wherein the discharge outlet is provided with a discharge switch, and the discharge switch is configured for opening or closing the discharge outlet.

8. The cyclic preheating coffee pot according to claim 7, wherein the driving element is provided with a first driving portion and a second driving portion, the first driving portion is located in a position corresponding to the water outlet switch and is configured for driving the water outlet switch to be turned on, and the second driving portion is located in a position corresponding to the discharge switch and is configured for driving the discharge switch to be turned on.

9. The cyclic preheating coffee pot according to claim 5, wherein the first filtering element is arranged in a position in front of the discharge outlet in the brewing cavity, the brewing cavity is further provided with a second filtering element, and the second filtering element is located at the discharge outlet.

10. The cyclic preheating coffee pot according to claim 5, further comprising a container for holding a coffee liquid, wherein the container is located below the discharge outlet, the container is provided with a container opening, and the container opening is provided with a third filtering element.

11. The cyclic preheating coffee pot according to claim 2, wherein the bottom portion of the water tank is provided with the flow dividing structure, the first branch of the flow dividing structure comprises a first channel configured to penetrate through the bottom portion of the water tank, and the second branch of the flow dividing structure is a transversely extending second channel arranged at the bottom portion of the water tank.

12. The cyclic preheating coffee pot according to claim 11, wherein the flow dividing structure further comprises a hollow water outlet element located in the water tank, the hollow water outlet element is provided with a hollow water outlet element outlet and a hollow water outlet element inlet, the hollow water outlet element inlet is connected to the first channel in a sleeving manner, the hollow water outlet element outlet is provided with the reflux switch, the reflux switch is a movable valve, and the movable valve is configured for opening or closing the hollow water outlet element outlet.

13. The cyclic preheating coffee pot according to claim 2, further comprising an air supply apparatus and an air guide part, wherein the air supply apparatus is arranged on the main body, and the air supply apparatus is connected to the brewing cavity via the air guide part and is configured for supplying air to the brewing cavity, such that the air supply apparatus can supply air to a liquid formed by mixing water with coffee powder when the brewing cavity contains water and coffee powder.

14. The cyclic preheating coffee pot according to claim 13, wherein the air guide part comprises a first air guide pipe and a second air guide pipe, the first air guide pipe is provided with a first end of the first air guide pipe and a second end of the first air guide pipe, the second air guide pipe is provided with a first end of the second air guide pipe and a second end of the second air guide pipe, a top portion of the brewing cavity is provided with a brewing cavity opening, the first end of the first air guide pipe is communicated with the air supply apparatus, the second end of the first air guide pipe is separably connected to the first end of the second air guide pipe, and the second end of the second air guide pipe is inserted into the brewing cavity via the brewing cavity opening.

15. The cyclic preheating coffee pot according to claim 14, wherein the brewing cavity opening is provided with a brewing cavity cap capable of covering the brewing cavity opening, and the brewing cavity cap is provided with several pores.

16. The cyclic preheating coffee pot according to claim 15, wherein the brewing cavity cap is provided with the second air guide pipe, the second air guide pipe comprises a cavity and a pipe portion communicated with the cavity, the brewing cavity cap is internally provided with the cavity, the cavity is communicated with the second end of the first air guide pipe, and the brewing cavity cap is provided with the pipe portion extending downward from the brewing cavity cap, such that the pipe portion extends into the brewing cavity when the brewing cavity cap covers the brewing cavity opening.

17. The cyclic preheating coffee pot according to claim 15, wherein the second air guide pipe penetrates through the brewing cavity opening, and the second end of the second air guide pipe is arranged in a position in the brewing cavity lower than a middle portion of the brewing cavity.

18. The cyclic preheating coffee pot according to claim 13, wherein a bottom portion of the brewing cavity is provided with a discharge outlet for discharging coffee, the brewing cavity is provided with a first filtering element, and the first filtering element is configured to enable the coffee to be filtered by the first filtering element before flowing out of the brewing cavity via the discharge outlet; and the discharge outlet is provided with a discharge switch, and the discharge switch is configured for opening or closing the discharge outlet.

19. The cyclic preheating coffee pot according to claim 18, wherein the driving apparatus comprises a driving element and a motor or an electromagnetic valve, the motor or the electromagnetic valve is arranged on the main body, and the electromagnetic valve or the motor is connected to the driving element and is configured for driving the driving element to move; the driving element is provided with a first driving portion and a second driving portion, the first driving portion is located in a position corresponding to the water outlet switch and is configured for driving the water outlet switch to be turned on, and the second driving portion is located in a position corresponding to the discharge switch and is configured for driving the discharge switch to be turned on.

20. The cyclic preheating coffee pot according to claim 1, wherein the water supply apparatus comprises the water tank mounted on the main body, the cyclic preheating coffee pot comprises the water pump and the one-way valve apparatus that are mounted on the main body, and the water pump is configured to pump water in the water tank to the heating apparatus, such that water flows back to the water tank or the brewing cavity via the heating apparatus, the water outlet pipe and the flow dividing structure.

21. A working method of a cyclic preheating coffee pot according to claim 1, the working method comprising the following steps:
- step a: adding coffee powder into the brewing cavity;
- step b: adding water into the water supply apparatus;
- step c: starting the heating apparatus, wherein the water flowing cyclically in the cyclic pipeline and is preheated by the heating apparatus to a set temperature; and
- step d: controlling, by the control apparatus, the driving apparatus to start when the water in the water supply apparatus is preheated to the set temperature, and driving, by the driving apparatus, the water outlet switch to be turned on, wherein the water flows through the second branch from the water outlet pipe and enters the brewing cavity.

* * * * *